(12) United States Patent
Xu et al.

(10) Patent No.: US 11,530,847 B2
(45) Date of Patent: Dec. 20, 2022

(54) CRYOCOOLER AND FLOW PATH SWITCHING MECHANISM OF CRYOCOOLER

(71) Applicant: SUMITOMO HEAVY INDUSTRIES, LTD., Tokyo (JP)

(72) Inventors: Mingyao Xu, Nishitokyo (JP); Qian Bao, Nishitokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 183 days.

(21) Appl. No.: 17/123,117

(22) Filed: Dec. 16, 2020

(65) Prior Publication Data

US 2021/0102734 A1 Apr. 8, 2021

Related U.S. Application Data

(63) Continuation of application No. PCT/JP2019/023552, filed on Jun. 13, 2019.

(30) Foreign Application Priority Data

Jul. 11, 2018 (JP) .............................. JP2018-131466

(51) Int. Cl.
*F25B 9/14* (2006.01)
*F16K 11/074* (2006.01)

(52) U.S. Cl.
CPC ............ *F25B 9/145* (2013.01); *F16K 11/074* (2013.01); *F25B 2309/003* (2013.01); *F25B 2309/1415* (2013.01); *F25B 2309/1418* (2013.01)

(58) Field of Classification Search
CPC .............. F25B 2309/1418; F25B 9/145; F25B 2309/003; F25B 2309/1415; F25B 9/14
See application file for complete search history.

(56) References Cited

U.S. PATENT DOCUMENTS

| 3,119,237 | A | * | 1/1964 | Gifford | ..................... F25B 9/14 62/86 |
| 4,339,927 | A | | 7/1982 | Sarcia | |
| 4,391,103 | A | | 7/1983 | Sarcia | |
| 4,543,793 | A | | 10/1985 | Chellis et al. | |

(Continued)

FOREIGN PATENT DOCUMENTS

| CN | 105222386 A | 1/2016 |
| JP | S58190665 A | 11/1983 |

(Continued)

*Primary Examiner* — Lionel Nouketcha
(74) *Attorney, Agent, or Firm* — HEA Law PLLC

(57) ABSTRACT

A cryocooler includes a cold head including a displacer movable in an axial direction, a drive piston connected to the displacer to move the displacer in the axial direction, an expansion chamber formed with the displacer, a piston drive chamber formed with the drive piston, a spool valve including a valve drive chamber, a spool that moves between a first position and a second position in response to a pressure of the valve drive chamber, and a pressure control mechanism configured to control a pressure of the valve drive chamber so that the spool reciprocates between the first position and the second position, and to generate a pressure fluctuation having an opposite phase to the pressure fluctuation in the expansion chamber in the piston drive chamber in synchronization with the reciprocation of the spool.

11 Claims, 14 Drawing Sheets

(56) References Cited

U.S. PATENT DOCUMENTS

| | | |
|---|---|---|
| 9,829,218 B2 | 11/2017 | Xu |
| 2013/0025297 A1 | 1/2013 | Matsubara et al. |
| 2019/0277542 A1 | 9/2019 | Xu et al. |

FOREIGN PATENT DOCUMENTS

| | | | |
|---|---|---|---|
| JP | H0468266 | A | 3/1992 |
| JP | 2005024239 | A | 1/2005 |
| JP | 2006234337 | A | 9/2006 |
| JP | 2013083428 | A | 5/2013 |
| JP | 5710602 | B2 | 4/2015 |
| WO | 2018101271 | A1 | 6/2018 |
| WO | 2018101273 | A1 | 6/2018 |

* cited by examiner

CRYOCOOLER AND FLOW PATH SWITCHING MECHANISM OF CRYOCOOLER

RELATED APPLICATIONS

The contents of Japanese Patent Application No. 2018-131466, and of International Patent Application No. PCT/JP2019/023552, on the basis of each of which priority benefits are claimed in an accompanying application data sheet, are in their entirety incorporated herein by reference.

BACKGROUND

Technical Field

Certain embodiments of the present invention relate to a cryocooler and a flow path switching mechanism of a cryocooler.

Description of Related Art

A cryocooler is used to cool an object to a cryogenic temperature. One representative example of the cryocooler is a Gifford-McMahon (GM) cryocooler. The GM cryocooler is roughly classified into two types such as a motor-driven type and a gas-driven type, depending on a drive source. In the motor-driven type, a displacer is mechanically connected to a motor, and is driven by the motor. In the gas-driven type, the displacer is driven by a gas pressure.

In the related art, in the cryocooler, a rotary valve is often used as a flow path switching mechanism. The rotary valve has a valve stator and a valve rotor that is in surface contact with the valve stator, and a plurality of working gas flow paths are formed on a contact surface. The valve rotor rotationally slides on the valve stator to switch connection between the working gas flow paths. In this manner, the flow path can be switched to properly operate the cryocooler.

SUMMARY

According to an aspect of the present invention, there is provided a cryocooler including a cold head including a displacer movable in an axial direction, a drive piston connected to the displacer to move the displacer in the axial direction, an expansion chamber being formed with the displacer, and a piston drive chamber being formed with the drive piston, the drive piston being driven in the axial direction by a pressure difference between the piston drive chamber and the expansion chamber. The cryocooler includes a spool valve including a valve drive chamber and a spool that moves between a first position and a second position in response to a pressure of the valve drive chamber, the spool connecting the expansion chamber to a compressor discharge port at the first position, the spool connecting the expansion chamber to a compressor suction port at the second position, and the spool reciprocating between the first position and the second position to generate a periodic pressure fluctuation in the expansion chamber. The cryocooler includes a pressure control mechanism configured to control a pressure of the valve drive chamber so that the spool reciprocates between the first position and the second position, and to generate a pressure fluctuation having an opposite phase to the pressure fluctuation in the expansion chamber in the piston drive chamber in synchronization with the reciprocation of the spool.

According to another aspect of the present invention, there is provided a flow path switching mechanism of a cryocooler. The cryocooler includes a cold head including a displacer movable in an axial direction, a drive piston connected to the displacer to move the displacer in the axial direction, an expansion chamber being formed with the displacer, and a piston drive chamber being formed with the drive piston, the drive piston being driven in the axial direction by a pressure difference between the piston drive chamber and the expansion chamber. The flow path switching mechanism includes a spool valve including a valve drive chamber and a spool that moves between a first position and a second position in response to a pressure of the valve drive chamber, the spool connecting the expansion chamber to a compressor discharge port at the first position, the spool connecting the expansion chamber to a compressor suction port at the second position, and the spool reciprocating between the first position and the second position to generate a periodic pressure fluctuation in the expansion chamber. The flow path switching mechanism includes a pressure control mechanism configured to control a pressure of the valve drive chamber so that the spool reciprocates between the first position and the second position, and to generate a pressure fluctuation having an opposite phase to the pressure fluctuation in the expansion chamber in the piston drive chamber in synchronization with the reciprocation of the spool.

DETAILED DESCRIPTION

Figure 1:
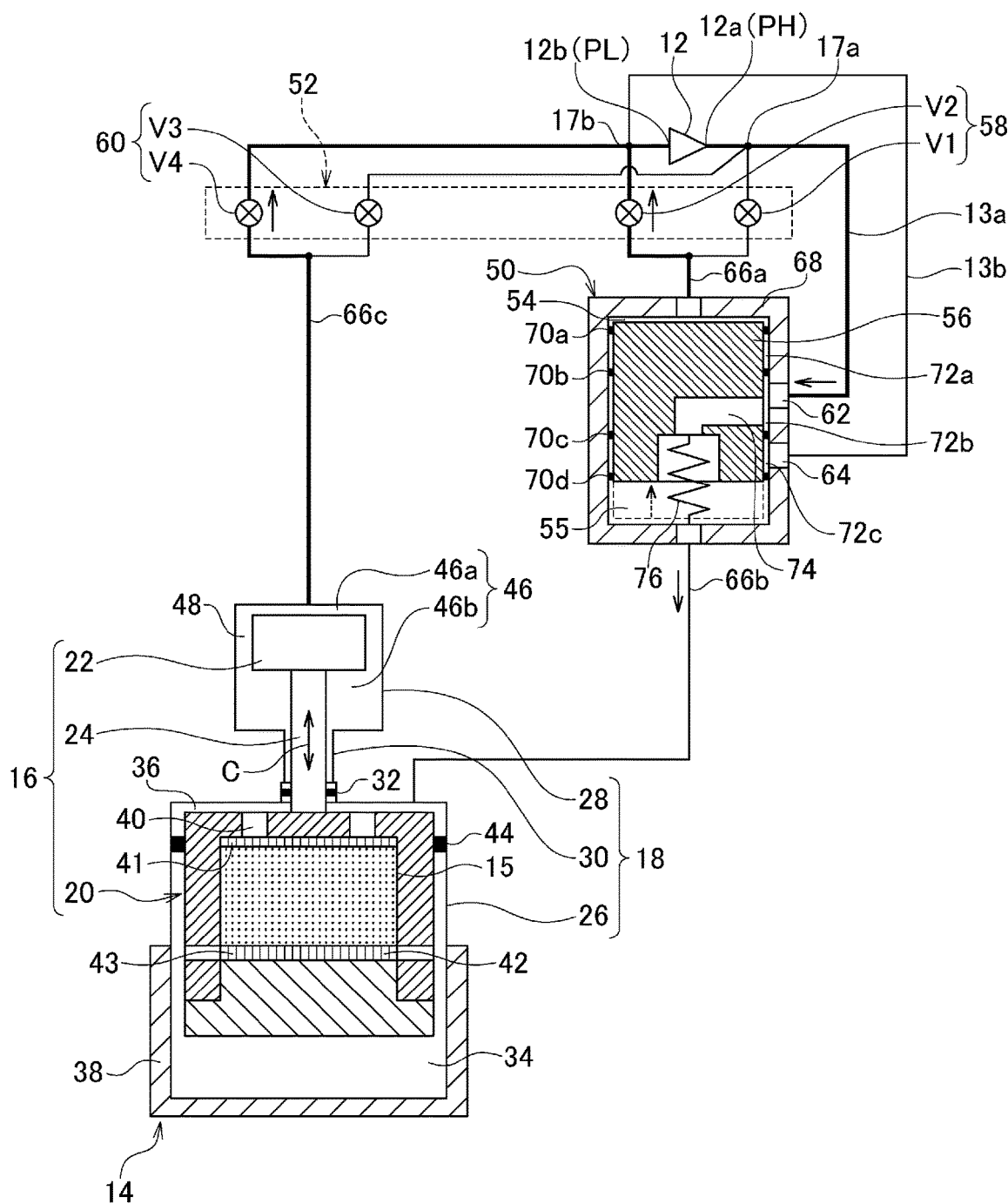
FIG. 1 is a view schematically illustrating cryocooler according to a first embodiment.

In order to improve refrigeration performance of the cryocooler, it is desirable to reduce a pressure loss generated in working gas in the working gas flow path of the rotary valve. One measure is to widen each individual working gas flow path. However, widening the flow path in this way can result in an increase in an area of a rotational sliding surface of the valve rotor. When the rotational sliding surface increases, frictional resistance acting on the rotating valve rotor also increases. In this case, a torque required for driving the valve rotor also increases, thereby leading to a size increase in a drive source such as a motor for driving the rotary valve. This disadvantage is remarkable in a large-size cryocooler.

It is desirable to suppress a size increase in a drive source of a flow path switching mechanism for a cryocooler.

Any desired combinations of the above-described components or those in which components or expressions according to the present invention are substituted with each other in methods, devices, and systems may be effectively adopted as an aspect of the present invention.

Hereinafter, embodiments according to the present invention will be described in detail with reference to the drawings. The same reference numerals will be assigned to the same or equivalent components, members, and processes in the description and the drawings, and repeated description will be appropriately omitted. Scales or shapes of respectively illustrated elements are set for convenience in order to facilitate the description, and are not to be interpreted in a limited manner unless otherwise specified. The embodiments described below are merely examples, and do not limit the scope of the present invention at all. All features or combinations thereof described in the embodiments are not necessarily essential to the invention.

Figure 2:
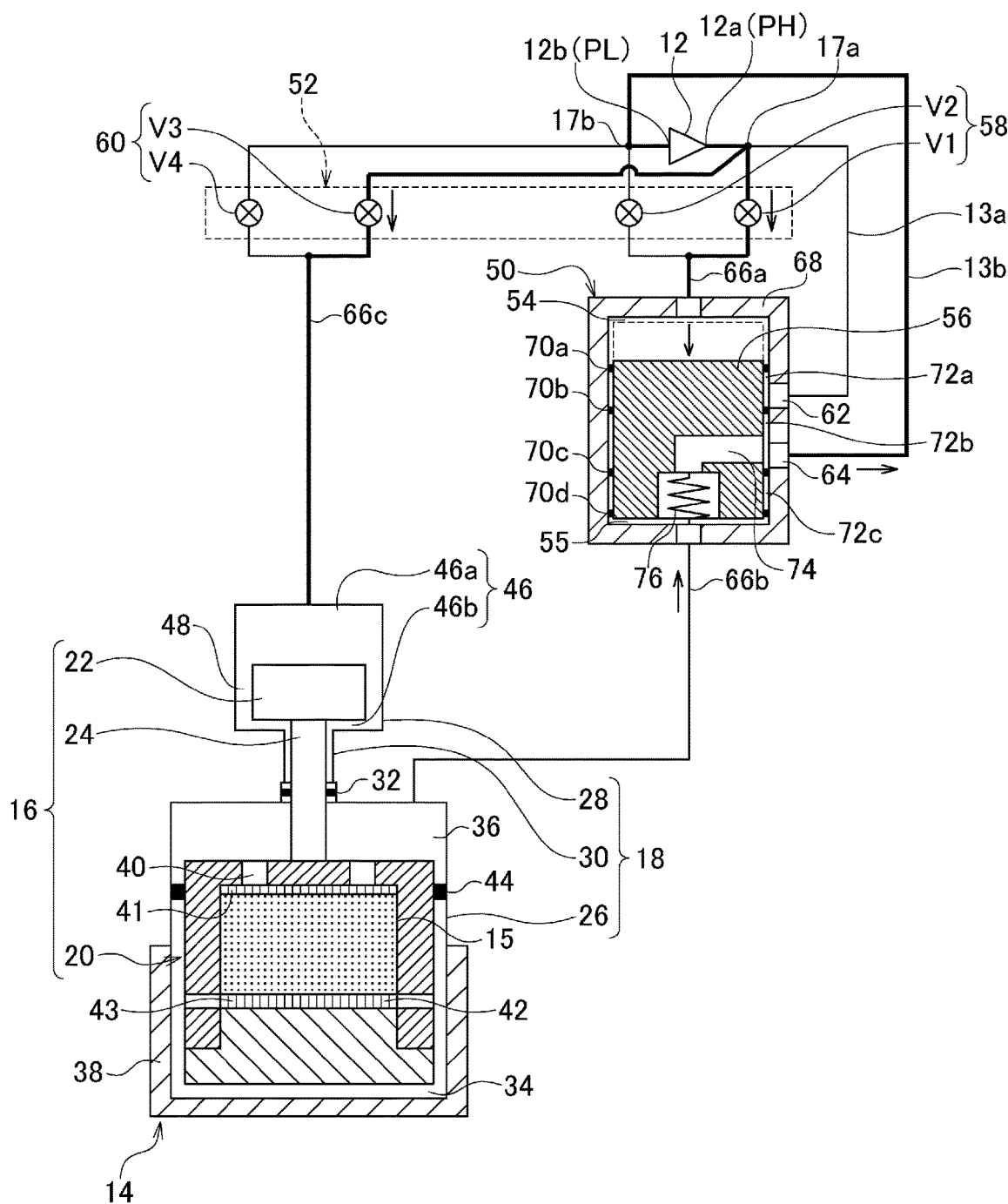
FIG. 2 is a view schematically illustrating the cryocooler according to the first embodiment.

FIGS. 1 and 2 are views schematically illustrating a cryocooler 10 according to a first embodiment. FIG. 1 illustrates an intake process of the cryocooler 10, and FIG. 2 illustrates an exhaust process of the cryocooler 10.

The cryocooler 10 is configured to serve as a gas-driven type GM cryocooler.

The GM cryocooler 10 includes a compressor 12 which compresses working gas (for example, helium gas) and a cold head 14 which cools the working gas through adiabatic expansion. The compressor 12 has a compressor discharge port 12a and a compressor suction port 12b. The compressor discharge port 12a and the compressor suction port 12b respectively function as a high pressure source and a low pressure source of the cryocooler 10. The cold head 14 is also called an expander.

As will be described in detail later, the compressor 12 supplies the working gas having a high pressure PH from the compressor discharge port 12a to the cold head 14. The cold head 14 includes a regenerator 15 which pre-cools the working gas. The precooled working gas is further cooled through expansion inside the cold head 14. The working gas decompressed through the expansion is recovered to the compressor suction port 12b through the regenerator 15. The working gas cools the regenerator 15 when the working gas passes through the regenerator 15. The compressor 12 compresses the recovered working gas having a low pressure PL, and supplies the working gas to the cold head 14 again.

Generally, both the high pressure PH and the low pressure PL are considerably higher than an ambient environmental pressure (for example, atmospheric pressure) of the cryocooler 10. Therefore, the high pressure PH and the low pressure PL can be respectively referred to as a first high pressure and a second high pressure. Usually, the high pressure PH is 2 to 3 MPa, for example. The low pressure PL is 0.5 to 1.5 MPa, for example.

The illustrated cold head 14 is a single stage type. However, the cold head 14 may be a multi-stage type.

The cold head 14 is the gas-driven type. Accordingly, the cold head 14 includes an axially movable body 16 serving as a free piston driven by a gas pressure, and a cold head housing 18 configured to hermetically accommodate the axially movable body 16. The cold head housing 18 supports the axially movable body 16 to be capable of reciprocating in an axial direction. Unlike a motor-driven type GM cryocooler, the cold head 14 does not have a motor for driving the axially movable body 16 and a connecting mechanism (for example, a scotch yoke mechanism).

The axially movable body 16 includes a displacer 20 capable of reciprocating in the axial direction (upward-downward direction in FIG. 1, indicated by an arrow C), and a drive piston 22 connected to the displacer 20 to drive the displacer 20 in the axial direction. The drive piston 22 is located coaxially with and away from the displacer 20 in the axial direction.

The cold head housing 18 includes a displacer cylinder 26 which accommodates the displacer 20, and a piston cylinder 28 which accommodates the drive piston 22. The piston cylinder 28 is located coaxially with and adjacent to the displacer cylinder 26 in the axial direction. Although details will be described later, a drive part of the cold head 14 which is the gas-driven type is configured to include the drive piston 22 and the piston cylinder 28.

In addition, the axially movable body 16 includes a connecting rod 24 that rigidly connects the displacer 20 to the drive piston 22 so that the displacer 20 reciprocates integrally with the drive piston 22 in the axial direction. The connecting rod 24 extends coaxially with the displacer 20 and the drive piston 22 from the displacer 20 to the drive piston 22.

The drive piston 22 has a smaller dimension than that of the displacer 20. An axial length of the drive piston 22 is shorter than that of the displacer 20, and a diameter of the drive piston 22 is smaller than that of the displacer 20. The diameter of the connecting rod 24 is smaller than that of the drive piston 22.

A volume of the piston cylinder 28 is smaller than that of the displacer cylinder 26. The axial length of the piston cylinder 28 is shorter than that of the displacer cylinder 26, and the diameter of the piston cylinder 28 is smaller than that of the displacer cylinder 26.

A dimensional relationship between the drive piston 22 and the displacer 20 is not limited to the above-described relationship, and may be different therefrom. Similarly, the dimensional relationship between the piston cylinder 28 and the displacer cylinder 26 is not limited to the above-described relationship, and may be different therefrom. For example, the drive piston 22 may be a tip part of the connecting rod 24, and the diameter of the drive piston 22 may be equal to the diameter of the connecting rod 24.

Axial reciprocation of the displacer 20 is guided by the displacer cylinder 26. In general, the displacer 20 and the displacer cylinder 26 are cylindrical members which respectively extend in the axial direction, and an inner diameter of the displacer cylinder 26 coincides with or slightly larger than an outer diameter of the displacer 20. Similarly, the axial reciprocation of the drive piston 22 is guided by the piston cylinder 28. In general, the drive piston 22 and the piston cylinder 28 are cylindrical members which respectively extend in the axial direction, and the inner diameter of the piston cylinder 28 coincides with or slightly larger than the outer diameter of the drive piston 22.

The displacer 20 and the drive piston 22 are rigidly connected to each other by the connecting rod 24. Accordingly, an axial stroke of the drive piston 22 is equal to an axial stroke of the displacer 20, and both of these integrally move over all strokes. A position of the drive piston 22 with respect to the displacer 20 is unchanged during the axial reciprocation of the axially movable body 16.

In addition, the cold head housing 18 includes a connecting rod guide 30 which connects the displacer cylinder 26 to the piston cylinder 28. The connecting rod guide 30 extends coaxially with the displacer cylinder 26 and the piston cylinder 28 from the displacer cylinder 26 to the piston cylinder 28. The connecting rod 24 penetrates the connecting rod guide 30. The connecting rod guide 30 is configured to serve as a bearing which guides the axial reciprocation of the connecting rod 24.

The displacer cylinder 26 is hermetically connected to the piston cylinder 28 via the connecting rod guide 30. In this way, the cold head housing 18 is configured to serve as a pressure vessel for the working gas. The connecting rod guide 30 may be considered as a portion of either the displacer cylinder 26 or the piston cylinder 28.

A rod seal portion 32 is provided between the connecting rod 24 and the connecting rod guide 30. The rod seal portion 32 is mounted on one of the connecting rod 24 and the connecting rod guide 30, and slides on the other of the connecting rod 24 and the connecting rod guide 30. For example, the rod seal portion 32 is configured to include a sealing member such as a slipper seal or an O-ring. The piston cylinder 28 is configured to be hermetic with respect to the displacer cylinder 26 by the rod seal portion 32. In this way, the piston cylinder 28 is fluidly isolated from the displacer cylinder 26, and a different magnitude can be generated between an internal pressure of the piston cylinder 28 and an internal pressure of the displacer cylinder 26. Since the rod seal portion 32 is provided, there is no direct gas circulation between the piston cylinder 28 and the displacer cylinder 26.

The displacer cylinder 26 is divided into an expansion chamber 34 and a room temperature chamber 36 by the displacer 20. The displacer 20 forms the expansion chamber 34 with the displacer cylinder 26 in one end in the axial direction, and forms the room temperature chamber 36 with the displacer cylinder 26 in the other end in the axial direction. The room temperature chamber 36 can also be called a compression chamber. The expansion chamber 34 is disposed on a bottom dead center side of the displacer 20, and the room temperature chamber 36 is disposed on a top dead center side of the displacer 20. In addition, the cold head 14 is provided with a cooling stage 38 fixed to the displacer cylinder 26 so as to wrap the expansion chamber 34.

The regenerator 15 is incorporated in the displacer 20. An upper lid portion of the displacer 20 has an inlet flow path 40 through which the regenerator 15 communicates with the room temperature chamber 36. In addition, a cylinder portion of the displacer 20 has an outlet flow path 42 through which the regenerator 15 communicates with the expansion chamber 34. Alternatively, the outlet flow path 42 may be provided in a lower lid portion of the displacer 20. In addition, the regenerator 15 includes an inlet retainer 41 inscribed in the upper lid portion and an outlet retainer 43 inscribed in the lower lid portion. A regenerator material may be a copper wire mesh, for example. The retainer may be a wire mesh which is coarser than the regenerator material.

A displacer seal portion 44 is provided between the displacer 20 and the displacer cylinder 26. For example, the displacer seal portion 44 is a slipper seal, and is mounted on the cylinder portion or the upper lid portion of the displacer 20. A clearance between the displacer 20 and the displacer cylinder 26 is sealed by the displacer seal portion 44. Accordingly, there is no direct gas circulation (that is, a gas flow bypassing the regenerator 15) between the room temperature chamber 36 and the expansion chamber 34.

When the displacer 20 moves in the axial direction, the expansion chamber 34 and the room temperature chamber 36 complementarily increase and decrease respective volumes. That is, when the displacer 20 moves downward, the expansion chamber 34 is narrowed, and the room temperature chamber 36 is widened. And vice versa.

The working gas flows into the regenerator 15 from the room temperature chamber 36 through the inlet flow path 40. More precisely, the working gas flows into the regenerator 15 from the inlet flow path 40 through the inlet retainer 41. The working gas flows into the expansion chamber 34 from the regenerator 15 by way of the outlet retainer 43 and the outlet flow path 42. When the working gas returns to the room temperature chamber 36 from the expansion chamber 34, the working gas passes a reverse path thereof. That is, the working gas returns to the room temperature chamber 36 from the expansion chamber 34 through the outlet flow path 42, the regenerator 15, and the inlet flow path 40. The working gas trying to flow into the clearance after bypassing the regenerator 15 is blocked by the displacer seal portion 44.

The piston cylinder 28 includes a piston drive chamber 46 whose pressure is controlled to drive the drive piston 22. The piston drive chamber 46 corresponds to an internal space of the piston cylinder 28. The piston drive chamber 46 is divided into an upper section 46a and a lower section 46b by the drive piston 22. The drive piston 22 forms the upper section 46a with the piston cylinder 28 in one end in the axial direction, and forms the lower section 46b with the piston cylinder 28 in the other end in the axial direction. When the drive piston 22 moves in the axial direction, the upper section 46a and the lower section 46b complementarily increase and decrease the respective volumes. The connecting rod 24 extends to the connecting rod guide 30 from a lower surface of the drive piston 22 through the lower section 46b. Furthermore, the connecting rod 24 extends to the upper lid portion of the displacer 20 through the room temperature chamber 36.

A piston seal portion 48 which is a clearance between the drive piston 22 and the piston cylinder 28 is provided between the drive piston 22 and the piston cylinder 28. The piston seal portion 48 acts as a flow path resistor to the gas circulation in the upper section 46a and the lower section 46b. The piston seal portion 48 may have a sealing member such as a slipper seal mounted on a side surface of the drive piston 22 so as to seal the clearance. In this case, the lower section 46b of the piston drive chamber 46 is sealed by the rod seal portion 32 and the piston seal portion 48.

The lower section 46b is narrowed when the drive piston 22 moves downward. At this time, the gas of the lower section 46b is compressed, and the pressure increases. The pressure of the lower section 46b acts upward on the lower surface of the drive piston 22. Accordingly, the lower section 46b generates a gas spring force which acts against the downward movement of the drive piston 22. The lower section 46b can also be called a gas spring chamber. Conversely, the lower section 46b is widened when the drive piston 22 moves upward. The pressure of the lower section 46b decreases, and the gas spring force acting on the drive piston 22 decreases.

The cold head 14 is installed in an illustrated direction at a job site where the cold head 14 is used. That is, the cold head 14 is vertically installed by disposing the displacer cylinder 26 below in the vertical direction and disposing the piston cylinder 28 above in the vertical direction, respectively. In this way, the cryocooler 10 has highest cooling capacity when the cooling stage 38 is installed by adopting a downward facing posture in the vertical direction. However, disposition of the cryocooler 10 is not limited thereto. Conversely, the cold head 14 may be installed by adopting a posture in which the cooling stage 38 faces upward in the vertical direction. Alternatively, the cold head 14 may be installed sideways or in any other direction.

A driving force applied to the drive piston 22 by the working gas pressure acts downward on the drive piston 22 when the drive piston 22 moves downward. Gravity also works downward due to its own weight of the axially movable body 16. Accordingly, when the cold head 14 is installed by adopting a posture in which the cooling stage 38 faces downward in the vertical direction, the driving force during the downward movement has an orientation the same as an orientation of the gravity. On the other hand, the driving force during the upward movement has an orientation opposite to an orientation of the gravity. The gas spring force acting on the drive piston 22 from the gas spring chamber (that is, the lower section 46b of the piston drive chamber 46) reduces or prevents a behavior difference between the upward movement and the downward movement of the axially movable body 16.

The cryocooler 10 is configured to generate a pressure difference between the piston cylinder 28 (that is, the piston drive chamber 46) and the displacer cylinder 26 (that is, the expansion chamber 34 and/or the room temperature chamber 36). The pressure difference causes the axially movable body 16 to move in the axial direction. When the pressure of the displacer cylinder 26 is lower than that of the piston cylinder 28, the drive piston 22 moves downward, and consequently, the displacer 20 also moves downward. Conversely, when the pressure of the displacer cylinder 26 is higher than that of the piston cylinder 28, the drive piston 22 moves upward, and consequently, the displacer 20 also moves upward.

In addition, although will be described in detail later, as the flow path switching mechanism of the working gas, the cryocooler 10 includes a spool valve 50 and a pressure control mechanism 52 which may be a rotary valve as an example. In contrast, a typical cryocooler has only a rotary valve as the flow path switching mechanism of the working gas.

The spool valve 50 includes a valve drive chamber (which may also be referred to as a first spool valve chamber) 54, and a spool 56 that moves between a first position and a second position in response to the pressure of the valve drive chamber 54. The spool 56 connects the expansion chamber 34 to the compressor discharge port 12a at the first position, and connects the expansion chamber 34 to the compressor suction port 12b at the second position. The spool valve 50 generates a periodic pressure fluctuation in the expansion chamber 34 by reciprocating between the first position and the second position of the spool 56. FIG. 1 illustrates the first position of the spool 56, and FIG. 2 illustrates the second position of the spool 56.

The pressure control mechanism 52 is configured to control the pressure of the valve drive chamber 54 so that the spool 56 reciprocates between the first position and the second position, and to generate the pressure fluctuation having an opposite phase compared to the expansion chamber 34 in the piston drive chamber 46 in synchronization with the reciprocation of the spool 56.

In the description herein, the term "opposite phase" can mean that periodic pressure fluctuations in two chambers having the same cycle have a phase difference of approximately 180 degrees. However, the present invention is not limited thereto. The phase difference between the pressure fluctuations in the two chambers (for example, the expansion chamber 34 and the piston drive chamber 46) can be referred to as the "opposite phase" as long as the phase difference is large enough to cause the displacer 20 to reciprocate (and a consequently generated volume fluctuation of the expansion chamber 34) in synchronization with the reciprocation (and a consequently generated volume fluctuation of the expansion chamber 34) of the spool 56 so as to form a thermodynamic cycle of the cryocooler 10. For example, the phase difference between the pressure fluctuations in the two chambers may be 150 degrees or larger, 160 degrees or larger, 170 degrees or larger, or 175 degrees or larger. For example, the phase difference between the pressure fluctuations in the two chambers may be 210 degrees or smaller, 200 degrees or smaller, 190 degrees or smaller, or 185 degrees or smaller.

Specifically, the pressure control mechanism 52 includes a spool valve pressure switching valve (hereinafter, also referred to as a main pressure switching valve) 58 and a piston drive chamber pressure switching valve (hereinafter, also referred to as an auxiliary pressure switching valve) 60. The main pressure switching valve 58 has a first on-off valve V1 and a second on-off valve V2. The auxiliary pressure switching valve 60 has a third on-off valve V3 and a fourth on-off valve V4.

The main pressure switching valve 58 is configured so that the compressor discharge port 12a or the compressor suction port 12b selectively communicates with the valve drive chamber 54 of the spool valve 50. In the main pressure switching valve 58, the first on-off valve V1 and the second on-off valve V2 are respectively and exclusively opened. That is, the first on-off valve V1 and the second on-off valve V2 are inhibited from being opened at the same time. The first on-off valve V1 and the second on-off valve V2 may be temporarily closed together.

The auxiliary pressure switching valve 60 is configured so that the compressor discharge port 12a or the compressor suction port 12b selectively communicates with the piston drive chamber 46 of the piston cylinder 28. The auxiliary pressure switching valve 60 is configured so that the third on-off valve V3 and the fourth on-off valve V4 are respectively and exclusively opened. That is, the third on-off valve V3 and the fourth on-off valve V4 are inhibited from being opened at the same time. The third on-off valve V3 and the fourth on-off valve V4 may be temporarily closed together.

The auxiliary pressure switching valve 60 is configured to control the pressure of the piston drive chamber 46 so that the drive piston 22 drives the displacer 20 to reciprocate in the axial direction. Typically, the pressure fluctuation in the piston drive chamber 46 is generated in a substantially opposite phase to and in the same cycle as that of the pressure fluctuation in the expansion chamber 34. When the expansion chamber 34 has the high pressure PH, the piston drive chamber 46 has the low pressure PL, and the drive piston 22 can move the displacer 20 upward. When the expansion chamber 34 has the low pressure PL, the piston drive chamber 46 has the high pressure PH, and the drive piston 22 can move the displacer 20 downward.

When the pressure control mechanism 52 adopts a form of the rotary valve, a group of valves (V1 to V4) is incorporated into the rotary valve, and is synchronously driven. The rotary valve is configured so that the valves (V1 to V4) are properly switched therebetween by rotational sliding of the valve disc (or the valve rotor) with respect to the valve main body (or the valve stator). The group of valves (V1 to V4) is switched in the same cycle during an operation of the cryocooler 10. In this manner, the four on-off valves (V1 to V4) periodically changes opened and closed states. The four on-off valves (V1 to V4) are opened and closed in respectively different phases.

The cryocooler 10 includes a high pressure line 13a and a low pressure line 13b which connect the compressor 12 to the spool valve 50 and the pressure control mechanism 52. The high pressure line 13a extends from the compressor discharge port 12a, branches in a high pressure line branch portion 17a, and is connected to a high pressure port 62 of the spool valve 50, the first on-off valve V1, and the third on-off valve V3. The low pressure line 13b extends from the compressor suction port 12b, branches in a low pressure line branch portion 17b, and is connected to a low pressure port 64 of the spool valve 50, the second on-off valve V2, and the fourth on-off valve V4.

In addition, the cryocooler 10 includes a first gas line 66a that connects the main pressure switching valve 58 to the spool valve 50, a second gas line 66b that connects the spool valve 50 to the displacer cylinder 26 of the cold head 14, and a third gas line 66c that connects the auxiliary pressure switching valve 60 to the piston cylinder 28. The first gas line 66a extends from the valve drive chamber 54, branches in an intermediate portion thereof, and is connected to the first on-off valve V1 and the second on-off valve V2. The second gas line 66b extends from a second spool valve chamber 55, and is connected to the room temperature chamber 36 of the cold head 14. The third gas line 66c extends from the upper section 46a of the piston drive chamber 46, branches in an intermediate portion thereof, and is connected to the third on-off valve V3 and the fourth on-off valve V4.

The high pressure line 13a and the low pressure line 13b may be respectively rigid or flexible pipes that connect the compressor 12, the cold head 14, and the pressure control mechanism 52. Similarly, the first gas line 66a, the second gas line 66b, and the third gas line 66c may be respectively rigid or flexible pipes.

The spool valve 50 has a sleeve 68 that accommodates the spool 56 and guides the movement of the spool 56. The valve drive chamber 54 is formed between one end of the spool 56 and the sleeve 68. The second spool valve chamber 55 is formed between the other end of the spool 56 and the sleeve 68. The valve drive chamber 54 and the second spool valve chamber 55 are located on sides opposite to the spool 56.

The spool 56 can move with respect to the sleeve 68 by using the pressure difference between the valve drive chamber 54 and the second spool valve chamber 55. When the valve drive chamber 54 has a lower pressure than the second spool valve chamber 55, the spool 56 moves inside the sleeve 68 (moves upward in the drawing) so that the valve drive chamber 54 contracts and the second spool valve chamber 55 expands. Conversely, when the valve drive chamber 54 has a higher pressure than the second spool valve chamber 55, the spool 56 moves inside the sleeve 68 (moves downward in the drawing) so that the valve drive chamber 54 expands and the second spool valve chamber 55 contracts.

The sleeve 68 has two through-holes acting as the high pressure port 62 and the low pressure port 64. In addition, the sleeve 68 has two other through-holes, through one of which the valve drive chamber 54 communicates with the first gas line 66a, and through the other of which the second spool valve chamber 55 communicates with the second gas line 66b.

As an example, the spool 56 is a columnar member, and the sleeve 68 is a member having a cylindrical inner peripheral surface coaxially disposed with the spool 56. The spool 56 and the sleeve 68 can also be respectively referred to as a piston and a cylinder. The high pressure port 62 and the low pressure port 64 are formed on a side surface of the sleeve 68, and two other through-holes are respectively formed on end surfaces of the sleeve 68. An extending direction of the spool 56 and the sleeve 68 may coincide with an axial direction C of the cold head 14, or may be other directions.

In addition, the spool valve 50 has a plurality of sealing members disposed in a clearance between the spool 56 and the sleeve 68, specifically, a first sealing member 70a, a second sealing member 70b, a third sealing member 70c, and a fourth sealing member 70d. The sealing members are mounted on the spool 56 at mutually different positions in the axial direction, and extend in a circumferential direction of the spool 56. The sealing member is a member that seals the working gas, such as a slipper seal or an O-ring. However, the sealing member may be the other contact seal or non-contact seal as long as the sealing member has desirable sealing performance.

A working gas space inside the spool valve 50 is separated into five sections including the valve drive chamber 54 and the second spool valve chamber 55 by the sealing members. The remaining three sections are formed in a clearance between the spool 56 and the sleeve 68. That is, the clearance is separated into a first clearance region 72a, a second clearance region 72b, and a third clearance region 72c, which are adjacent to each other in the axial direction of the spool 56.

The first sealing member 70a is disposed between the valve drive chamber 54 and the first clearance region 72a, and is configured to prevent or minimize direct circulation of the working gas therebetween. The second sealing member 70b is disposed between the first clearance region 72a and the second clearance region 72b, and is configured to prevent or minimize direct circulation of the working gas therebetween. The third sealing member 70c is disposed between the second clearance region 72b and the third clearance region 72c, and is configured to prevent or minimize direct circulation of the working gas between therebetween. The fourth sealing member 70d is disposed between the third clearance region 72c and the second spool valve chamber 55, and is configured to prevent or minimize direct circulation of the working gas therebetween.

The spool 56 has a spool main flow path 74. One end of the spool main flow path 74 communicates with the second clearance region 72b, and the other end of the spool main flow path 74 communicates with the second spool valve chamber 55. The spool main flow path 74 may be formed to penetrate the spool 56 from a side surface to an end surface of the spool 56.

A return spring 76 is provided between the spool 56 and the sleeve 68. The return spring 76 biases the spool 56 to an initial position between the top dead center and the bottom dead center of the spool 56, for example. The return spring 76 can pull the spool 56 downward when the spool 56 is located at top dead center, and can pull the spool 56 upward when the spool 56 is located at bottom dead center. The return spring 76 is accommodated in the second spool valve chamber 55. The return spring 76 may be provided in the valve drive chamber 54. In addition, it is not essential to provide the return spring 76, and the spool valve 50 may not include the return spring 76.

The spool valve 50 may be disposed in the cold head housing 18, and may be connected to the compressor 12 and the pressure control mechanism 52 by using a pipe. For example, the spool valve 50 may be mounted on the cold head 14 to be disposed adjacent to the room temperature chamber 36. In this way, the length of the second gas line 66b can be shortened. The spool main flow path 74, the second spool valve chamber 55, and the second gas line 66b forma so-called dead volume that does not contribute to cooling capacity of the cryocooler 10. Therefore, the dead volume can be reduced by shortening the length of the second gas line 66b. This configuration is helpful in improving the cooling capacity of the cryocooler 10.

Alternatively, the spool valve 50 may be disposed away from the cold head 14, and may be connected to the cold head 14 by using a pipe.

Figure 3:
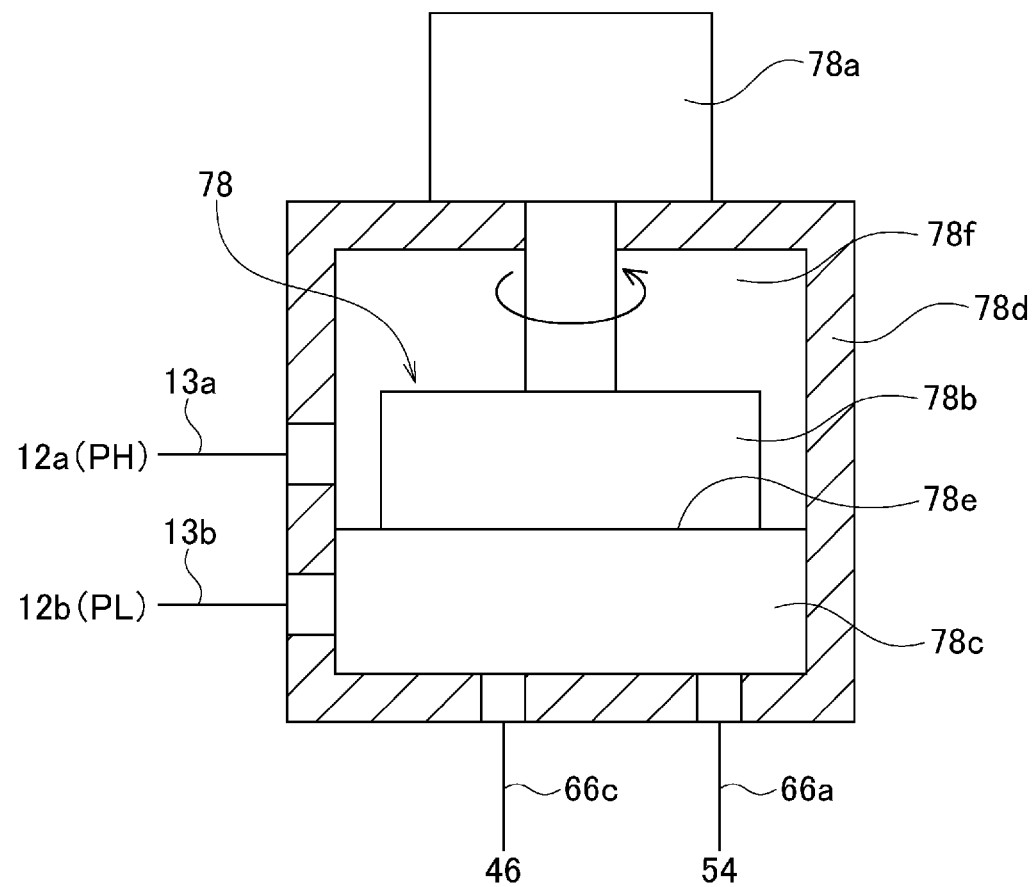
FIG. 3 is a view schematically illustrating an exemplary configuration of a pressure control mechanism applicable to a cryocooler according to a certain embodiment.

FIG. 3 is a view schematically illustrating an exemplary configuration of the pressure control mechanism 52 applicable to the cryocooler 10 according to a certain embodiment. The pressure control mechanism 52 includes a rotary valve 78 which alternately connects the compressor discharge port 12a and the compressor suction port 12b to the valve drive chamber 54, and which alternately connects the compressor discharge port 12a and the compressor suction port 12b to the piston drive chamber 46.

For example, the rotary valve 78 includes a motor 78a such as a rotary electric motor, a valve rotor 78b, a valve stator 78c, and a valve housing 78d. The valve rotor 78b and the valve stator 78c are accommodated in the valve housing 78d, and both are disposed adjacent to each other to be in surface contact with each other on a valve sliding surface 78e. The valve stator 78c is fixed to the valve housing 78d. The motor 78a is installed outside the valve housing 78d, and an output shaft of the motor 78a extends to the valve rotor 78b after penetrating the valve housing 78d.

A pressure chamber 78f is formed inside the valve housing 78d, and the valve rotor 78b and the valve stator 78c are disposed in the pressure chamber 78f. As an example, the high pressure line 13a is connected to the pressure chamber 78f, into which the high pressure PH is introduced. The low pressure line 13b, the first gas line 66a, and the third gas line 66c are connected to the valve stator 78c. At least two sealing members are mounted between the valve stator 78c and the valve housing 78d. One sealing member seals the low pressure line 13b from the pressure chamber 78f (that is, the high pressure line 13a), and the other sealing member seals the first gas line 66a and the third gas line 66c from the low pressure line 13b. The first gas line 66a and the third gas line 66c are also sealed to each other by an appropriate sealing member. Therefore, the direct circulation of the working gas among the high pressure line 13a, the low pressure line 13b, the first gas line 66a, and the third gas line 66c is prevented inside the rotary valve 78.

The output shaft is rotated by driving the motor 78a, thereby causing the valve rotor 78b to rotationally slide with respect to the valve stator 78c. The flow path connection is periodically switched on the valve sliding surface 78e as the valve rotor 78b rotationally slides. The rotary valve 78 alternately connects the high pressure line 13a and the low pressure line 13b to the first gas line 66a. Similarly, the flow path connection is periodically switched on the valve sliding surface 78e as the valve rotor 78b rotationally slides. The rotary valve 78 alternately connects the high pressure line 13a and the low pressure line 13b to the third gas line 66c.

As a specific flow path configuration of the rotary valve 78 including the valve rotor 78b and the valve stator 78c, various known flow path configurations can be appropriately adopted. Accordingly, detailed description thereof will be omitted. In the above description, the high pressure line 13a is connected to the pressure chamber 78f, and the low pressure line 13b is connected to the valve stator 78c. Conversely, a configuration can be adopted so that the high pressure line 13a is connected to the valve stator 78c, and the low pressure line 13b is connected to the pressure chamber 78f.

In this way, when the pressure control mechanism 52 is configured to serve as the rotary valve 78, the existing design of the rotary valve of the cryocooler can be used. Therefore, the pressure control mechanism 52 can be easily and advantageously manufactured.

As an example of using the cryocooler 10, a superconducting electromagnet that generates a strong magnetic field is cooled. When the cryocooler 10 is operated in an environment of the strong magnetic field, a rated torque of the motor 78a may be affected and reduced by the magnetic field. An insufficient torque may cause the motor 78a to step out or slip. For example, in a case of the GM cryocooler, the operation of the rotary valve 78 at a constant speed may be hindered, and the cooling capacity may be degraded.

A magnetic shield may be installed in the cryocooler 10 to prevent the strong magnetic field from acting on the motor 78a. In order to effectively prevent the action of the strong magnetic field, it is desirable that the magnetic shield has a sufficient thickness. However, the magnetic shield may cause a side effect in that the cryocooler 10 may remarkably increase in weight and size. In addition, the strong magnetic field may magnetize the magnetic shield, and may generate an undesired strong electromagnetic attraction.

Therefore, the pressure control mechanism 52, that is, the rotary valve 78 may be disposed away from the cold head 14, and may be connected to the cold head 14 by using a pipe. In this way, the motor 78a can be disposed at a position sufficiently away from the cold head 14 and the superconducting electromagnet to be cooled, and the influence of the strong magnetic field on the motor 78a can be sufficiently reduced. The magnetic shield surrounding the motor 78a may be unnecessary. Therefore, some of the above-described problems can be minimized or solved.

Alternatively, when the cryocooler 10 is used for other purposes in which the strong magnetic field does not act on the cryocooler 10, the pressure control mechanism 52 may be disposed in the cold head housing 18, and the compressor 12 and the spool valve 50 may be connected to each other by using a pipe.

Figure 4:
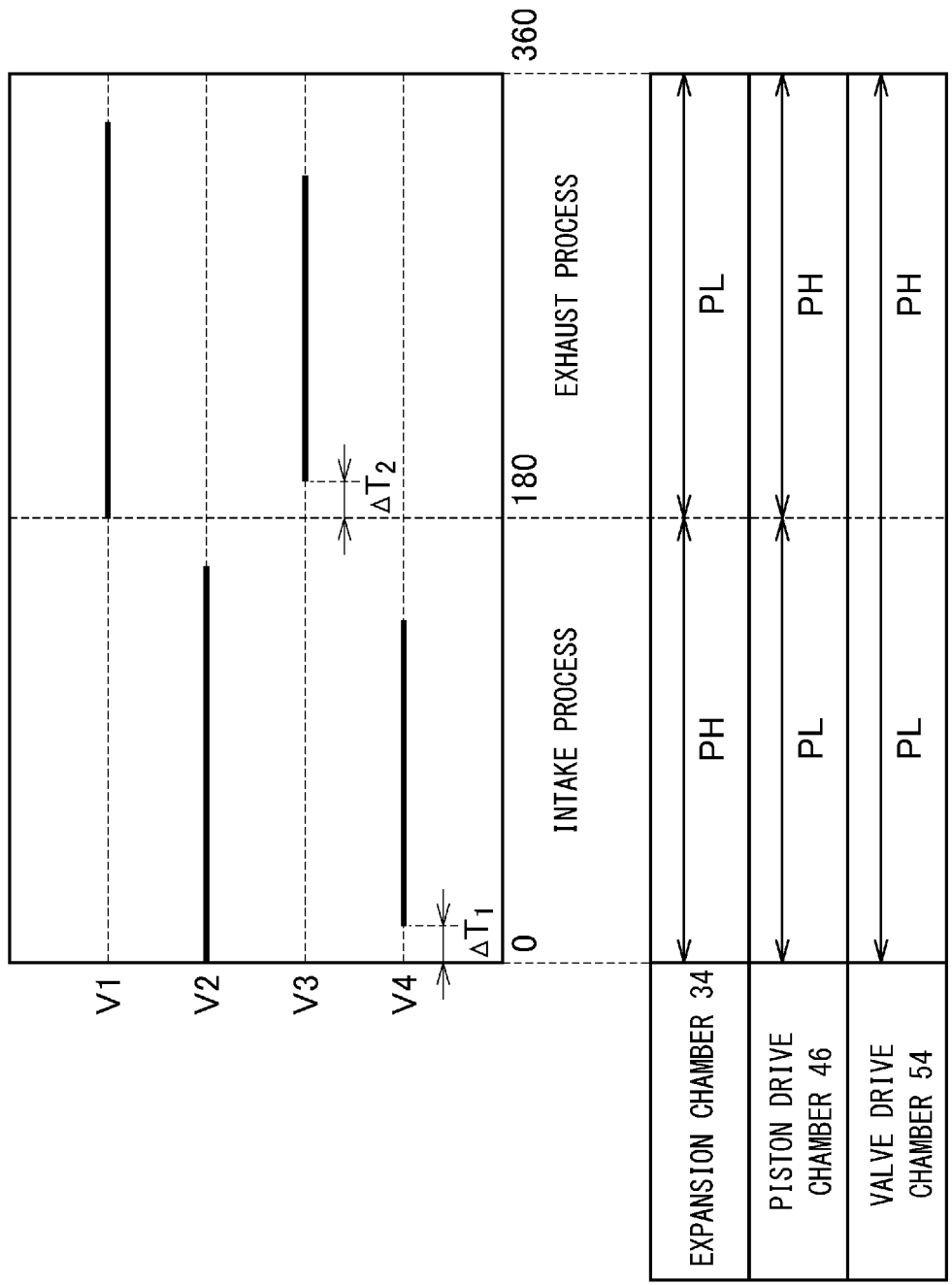
FIG. 4 is a view illustrating a valve timing and a pressure fluctuation of the cryocooler according to the first embodiment.

FIG. 4 is a view illustrating a valve timing and a pressure fluctuation of the cryocooler 10 according to the first embodiment. The upper part in FIG. 4 illustrates the valve timing of the respective valves (V1 to V4) over one cycle of a refrigeration cycle of the cryocooler 10, and the lower part in FIG. 4 illustrates pressure fluctuations in the expansion chamber 34, the piston drive chamber 46, and the valve drive chamber 54. In the illustration of the valve timing, a solid line indicates that the valve is open, and a dashed line indicates that the valve is closed. In addition, the pressure fluctuation is schematically illustrated by ignoring a transient change caused by the opening and closing of the valve.

An operation of the cryocooler 10 will be described with reference to FIGS. 1, 2, and 4. As described above, FIG. 1 illustrates a state of the intake process of the cryocooler 10, and FIG. 2 illustrates a state of the exhaust process of the cryocooler 10. The spool 56 of the spool valve 50 moves to the first position in the intake process, and moves to the second position in the exhaust process. The first position and the second position can also be respectively referred to as an intake position and an exhaust position.

When the displacer 20 is located at or in the vicinity of the bottom dead center, the intake process of the cryocooler 10 starts (a position of the displacer 20 at this time is illustrated in FIG. 2. The reason is that the intake process starts when the exhaust process ends).

In the intake process, as illustrated in FIGS. 1 and 4, the second on-off valve V2 is opened, and the first on-off valve V1 is closed. The compressor suction port 12b communicates with the valve drive chamber 54, and the pressure in the valve drive chamber 54 is the low pressure PL. At this time, the second spool valve chamber 55 has a pressure slightly higher than the low pressure PL. The reason is that the pressure fluctuations inside the cold head 14 (that is, the expansion chamber 34 and the room temperature chamber 36) are slightly delayed compared to the pressure fluctuations in the valve drive chamber 54. When the intake process starts, the spool 56 is located at or in the vicinity of the bottom dead center (indicated by a dashed line in the second spool valve chamber 55 in FIG. 1). The spool 56 moves inside the sleeve 68 in the axial direction (indicated by a dashed line arrow) so that the valve drive chamber 54 contracts due to the pressure difference between the valve drive chamber 54 and the second spool valve chamber 55. A restoring force of the return spring 76 is helpful in moving the spool 56 upward.

As illustrated in FIG. 1, when the spool 56 reaches the first position, that is, the spool 56 reaches the top dead center or the vicinity due to the upward movement of the spool 56, the second clearance region 72b is adjacent to the high pressure port 62. The high pressure port 62 is connected to the second spool valve chamber 55 through the spool main flow path 74. In this way, the spool valve 50 connects the compressor discharge port 12a to the expansion chamber 34. The working gas having the high pressure PH is supplied from the compressor discharge port 12a to the cold head 14 via the spool valve 50 and the second gas line 66b. Furthermore, the working gas flows from the room temperature chamber 36 to the expansion chamber 34 through the regenerator 15. The expansion chamber 34 has the high pressure PH. At this time, the third clearance region 72c is adjacent to the low pressure port 64. The low pressure port 64 is closed by the spool 56. Accordingly, the expansion chamber 34 and the compressor suction port 12b are disconnected from each other.

The exhaust to the piston drive chamber 46 is performed simultaneously with the start of the intake to the expansion chamber 34 or to be slightly delayed from the start of the intake to the expansion chamber 34 (for example, a first delay time $\Delta T_1$ illustrated in FIG. 4). In the intake process, as illustrated in FIGS. 1 and 4, the fourth on-off valve V4 is opened, and the third on-off valve V3 is closed. The working gas is recovered from the piston drive chamber 46 to the compressor suction port 12b through the third gas line 66c, the fourth on-off valve V4, and the low pressure line 13b, and the pressure of the piston drive chamber 46 decreases to the low pressure PL. The first delay time $\Delta T_1$ may be set so that the displacer 20 starts to move upward after the pressure of the expansion chamber 34 substantially increases to the high pressure PH. This contributes to the improvement of the cooling capacity of the cryocooler 10.

Therefore, in the intake process, a driving force generated by a differential pressure between the piston drive chamber 46 and the expansion chamber 34 (that is, a driving force proportional to a differential pressure PH-PL) acts upward on the drive piston 22. Therefore, the displacer 20 moves from the bottom dead center to the top dead center inside the cold head 14 together with the drive piston 22. A volume of the expansion chamber 34 increases, and the expansion chamber 34 is filled with the high pressure gas. In this way, a state where the displacer 20 reaches the top dead center or a position in the vicinity of the top dead center is illustrated in FIG. 1.

When the displacer 20 is located at or in the vicinity of the top dead center, the exhaust process of the cryocooler 10 starts. As illustrated in FIGS. 2 and 4, in the exhaust process, the first on-off valve V1 is opened, and the second on-off valve V2 is closed. The compressor discharge port 12a communicates with the valve drive chamber 54, and the pressure in the valve drive chamber 54 reaches the high pressure PH. At this time, the second spool valve chamber 55 has a pressure slightly lower than the high pressure PH. When the exhaust process starts, the spool 56 is located at or in the vicinity of the top dead center (indicated by a dashed line in the valve drive chamber 54 in FIG. 2). The spool 56 moves inside the sleeve 68 in the axial direction (indicated by a dashed line arrow) so that the valve drive chamber 54 expands due to the pressure difference between the valve drive chamber 54 and the second spool valve chamber 55. The restoring force of the return spring 76 is helpful in moving the spool 56 downward.

As illustrated in FIG. 2, when the spool 56 reaches the second position, that is, the spool 56 reaches at or in the vicinity of the bottom dead center due to the downward movement of the spool 56, the second clearance region 72b is adjacent to the low pressure port 64. The low pressure port 64 is connected to the second spool valve chamber 55 through the spool main flow path 74. In this way, the spool valve 50 connects the compressor suction port 12b to the expansion chamber 34. The high pressure gas is expanded and cooled in the expansion chamber 34. The expanded gas flows to the spool valve 50 through the room temperature chamber 36 while cooling the regenerator 15. The working gas is collected in the compressor 12 through the spool valve 50 and the low pressure line 13b. The expansion chamber 34 has the low pressure PL. At this time, the first clearance region 72a is adjacent to the high pressure port 62. The high pressure port 62 is closed by the spool 56. Accordingly, the expansion chamber 34 and the compressor discharge port 12a are disconnected from each other.

The intake to the piston drive chamber 46 is performed simultaneously with the start of the exhaust from the expansion chamber 34 or to be slightly delayed from the start of the exhaust from the expansion chamber 34 (for example, a second delay time $\Delta T_2$ illustrated in FIG. 4). In the exhaust process, as illustrated in FIGS. 2 and 4, the third on-off valve V3 is opened, and the fourth on-off valve V4 is closed. The working gas is supplied from the compressor discharge port 12a to the piston drive chamber 46 through the high pressure line 13a, the third on-off valve V3, and the third gas line 66c, and the piston drive chamber 46 has the high pressure PH. The second delay time $\Delta T_2$ may be set so that the displacer 20 starts to move downward after the pressure of the expansion chamber 34 substantially decreases to the low pressure PL. This contributes to the improvement of the cooling capacity of the cryocooler 10.

Therefore, in the exhaust process, the driving force (that is, the driving force proportional to the differential pressure PH-PL) acts downward on the drive piston 22 due to the differential pressure between the piston drive chamber 46 and the expansion chamber 34. Therefore, the displacer 20 moves from the top dead center to the bottom dead center inside the cold head 14 together with the drive piston 22. In this way, the volume of the expansion chamber 34 decreases, and the low pressure gas is discharged.

In this way, the spool valve 50 functions as the flow path switching mechanism of the cryocooler 10 which alternately connects the compressor discharge port 12a and the compressor suction port 12b to the expansion chamber 34. The pressure control mechanism 52 functions as a drive source of the flow path switching mechanism. The pressure control mechanism 52 alternately connects the compressor discharge port 12a and the compressor suction port 12b to the valve drive chamber 54 of the spool valve 50. In this manner, the pressure control mechanism 52 can control the pressure in the valve drive chamber 54 so that the spool 56 properly reciprocates. In addition, the pressure control mechanism 52 alternately connects the compressor discharge port 12a and the compressor suction port 12b to the piston drive chamber 46. In this manner, the pressure control mechanism 52 can control the pressure in the piston drive chamber 46 so that the displacer 20 properly reciprocates.

The cryocooler 10 cools the cooling stage 38 by repeating the refrigeration cycle (that is, the GM cycle) in this way. In this manner, the cryocooler 10 can cool a superconducting device or other cooling objects (not illustrated) thermally coupled to the cooling stage 38.

The valve timing illustrated in FIG. 4 is an example, and should not be construed in a limited way. The valve timing of the respective valves (V1 to V4) may deviate somewhat from the illustrated example. For example, in FIG. 4, closing the third on-off valve V3 precedes closing the first on-off valve V1 somewhat, but this configuration is not essential. Closing the third on-off valve V3 may coincide with closing the first on-off valve V1, or may be delayed somewhat from closing the first on-off valve V1. Similarly, closing the fourth on-off valve V4 precedes closing the second on-off valve V2 somewhat, but this configuration is not essential.

As described above, a typical cryocooler adopts a rotary valve as the flow path switching mechanism, and some working gas ports are provided on the rotational sliding surface of the rotary valve. In order to switch the interconnection between the working gas ports by rotation, the ports are disposed at mutually different places on the rotational sliding surface in the radial direction. In order to reduce a pressure loss generated in the working gas inside the rotary valve, it is necessary to widen the port. However, this leads to an increase in the diameter of the rotary valve, that is, an increase in the area of the rotational sliding surface. When the rotational sliding surface increases, the frictional resistance that acts during the rotation increases. Therefore, the torque required for driving the rotary valve also increases, and a large drive source such as a motor is required. This results in a disadvantage in that the manufacturing cost of the rotary valve increases and the cryocooler increases in size. In particular, the disadvantage is remarkable in a large-size cryocooler that outputs large cooling capacity.

In the cryocooler using the rotary valve, the rotary valve is installed in the cold head, as in the GM cryocooler, for example. The motor that rotates the rotary valve forms a portion of the cold head, and in the existing design of a large cryocooler, the large motor is directly installed in the cold head. The Large motor is not preferable since the large motor is a generation source of corresponding electromagnetic noise and/or mechanical vibration. In addition, as described above, when the cryocooler is used in the environment of the strong magnetic field, a thick magnetic shield may be required in order to suppress the influence of the strong magnetic field on the motor.

In order to avoid this problem, it is conceivable to adopt a design in which a rotary valve unit is disposed away from the cold head so that both of these are connected to each other by using a long pipe. However, in this design, a piping volume increases from the working gas inlet and outlet of the rotary valve to the regenerator of the cold head. The volume is a dead volume that does not contribute to the cooling capacity. Therefore, the increase is not desirable.

In this way, in the existing cryocooler using the rotary valve as the flow path switching mechanism, it is difficult to realize sufficiently reduced noise and vibration transmitted from the rotary valve to the cold head, without avoiding the increased dead volume and the degraded cooling capacity.

In contrast, the cryocooler 10 according to the embodiment uses the spool valve 50 as the flow path switching mechanism for the expansion chamber 34 of the cold head 14. Therefore, the disadvantage caused by the rotary valve as described above is unlikely to occur.

In the spool valve 50, even when the valve internal flow path such as the spool main flow path 74 expands, the expansion does not directly relate to a size increase in the drive source. The spool valve 50 is fluidly operated by the working gas pressure of the valve drive chamber 54. Therefore, a volume of the valve drive chamber 54 may be relatively small. Therefore, the internal flow path of the spool valve 50 can expand while the size of the valve drive chamber 54 is minimized. In this manner, it is possible to reduce the pressure loss generated in the working gas inside the spool valve 50. Compared to a case of adopting the rotary valve, it is possible to suppress the size increase in the drive source of the flow path switching mechanism for the cryocooler 10.

In addition, although the rotary valve 78 is adopted for the pressure control mechanism 52, the rotary valve 78 is connected to the piston drive chamber 46 and the valve drive chamber 54, and is not connected to the expansion chamber 34. When the pressure control mechanism 52 is disposed remotely from the cold head 14, the pipes (for example, the first gas line 66a and the third gas line 66c) connecting the pressure control mechanism 52 to the cold head 14 is lengthened, and the volumes increase. However, the increased volume is not the dead volume since the intake to and the exhaust from the cold head 14 are in the opposite phase. Therefore, the cooling capacity of the cryocooler 10 is hardly affected or not affected at all by the disposition of the pressure control mechanism 52 with respect to the cold head 14.

Therefore, in the cryocooler 10 according to the embodiment, it is allowable to dispose the pressure control mechanism 52 away from the cold head 14. In this manner, it is possible to suppress a possibility that the noise and the vibration which can be generated by the pressure control mechanism 52 may be transmitted to the cold head 14. In addition, as described above, the magnetic shield that can be attached to the pressure control mechanism 52 can be simplified, or can be unnecessary.

In addition, each volume of the piston drive chamber 46 and the valve drive chamber 54 may be relatively reduced. Accordingly, the pressure control mechanism 52 may have a relatively small size. Therefore, the noise or the vibration which can be generated by the pressure control mechanism 52 is reduced in the first place, and the influence on the cold head 14 is also reduced.

Furthermore, in the cryocooler 10 according to the embodiment, the pressure control mechanism 52 is configured so that the pressure fluctuation having an opposite phase to the pressure fluctuation of the expansion chamber 34 is generated (not only in the piston drive chamber 46) but also in the valve drive chamber 54. In this way, as illustrated in FIG. 4, it is not necessary to supply the working gas to the piston drive chamber 46 and the valve drive chamber 54 in the intake process. Therefore, a flow rate of the working gas supplied from the compressor 12 to the expansion chamber 34 can be reduced, which is helpful in reducing the load and decreasing the compressor 12 in size.

The pressure control mechanism 52 may be configured so that the pressure fluctuation having the same phase as the pressure fluctuation of the expansion chamber 34 or any desired phase difference is generated in the valve drive chamber 54. The compressor 12 may have to supply the working gas to the expansion chamber 34 and the valve drive chamber 54 at the same time. However, when the volume of the valve drive chamber 54 is relatively reduced, no remarkable influence may occur. In this configuration, as will be described later, in order to properly synchronize the reciprocation of the spool 56 and the pressure control of the expansion chamber 34 controlled by the spool valve 50 with each other, the spool main flow path 74 may be separated from the second spool valve chamber 55 without communicating with the second spool valve chamber 55. The pressure in the second spool valve chamber 55 may be properly controlled.

In addition, in the cryocooler 10 according to the embodiment, the spool valve 50 includes a connection flow path sealed from the second spool valve chamber 55 adjacent to the spool 56 on the side opposite to the valve drive chamber 54 and the valve drive chamber 54, and connected to the expansion chamber 34 via the second spool valve chamber 55. The connection flow path includes the spool main flow path 74. The connection flow path connects the expansion chamber 34 to the compressor discharge port 12a when the spool 56 is located at the first position, and connects the expansion chamber 34 to the compressor suction port 12b when the spool 56 is located at the second position. In this case, it is easy to relatively enlarge the area of the working gas flow path inside the spool valve 50.

Figure 5:
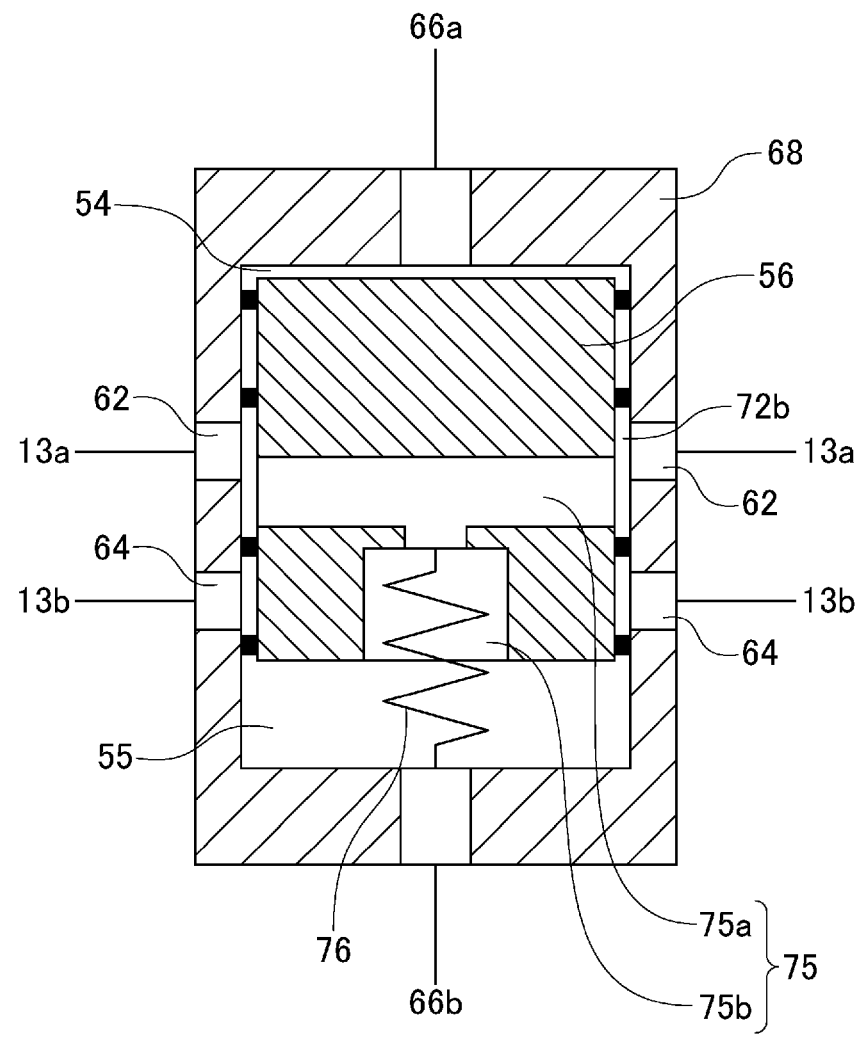
FIG. 5 is a view schematically illustrating another configuration of a spool valve applicable to a cryocooler according to a certain embodiment.

FIG. 5 is a view schematically illustrating another configuration of the spool valve 50 applicable to the cryocooler 10 according to a certain embodiment. In the embodiment described with reference to FIGS. 1 and 2, the spool main flow path 74 is opened at one location on the side surface of the spool 56, and communicates with the second spool valve chamber 55. The spool main flow path 74 is not symmetrical around the center axis of the spool 56. In contrast, as illustrated in FIG. 5, the spool valve 50 may include a spool internal flow path 75 symmetrically disposed around the center axis of the spool 56.

The spool internal flow path 75 has a plurality of flow paths 75a symmetrically disposed around the center axis of the spool 56. The plurality of flow paths 75a are all open in the second clearance region 72b, and are disposed at an equal interval in the circumferential direction of the spool 56. In addition, the spool internal flow path 75 has a communication path 75b extending from a merging point of the plurality of flow paths 75a along the center axis, and connecting the plurality of flow paths 75a to the second spool valve chamber 55. The sleeve 68 has a plurality of high pressure ports 62 and a plurality of low pressure ports 64 corresponding to the plurality of flow paths 75a. The plurality of high pressure ports 62 are connected to the high pressure line 13a, and the plurality of low pressure ports 64 are connected to the low pressure line 13b. The high pressure port 62 and the low pressure port 64 are also symmetrically disposed around the center axis of the spool 56.

In this way, the spool valve 50 includes the flow paths symmetrically disposed around the center axis of the spool 56. Accordingly, eccentricity of the spool 56 can be suppressed. It is possible to suppress unbalanced abrasion of the spool 56 which may occur when the spool 56 reciprocates in the axial direction.

Figure 6:
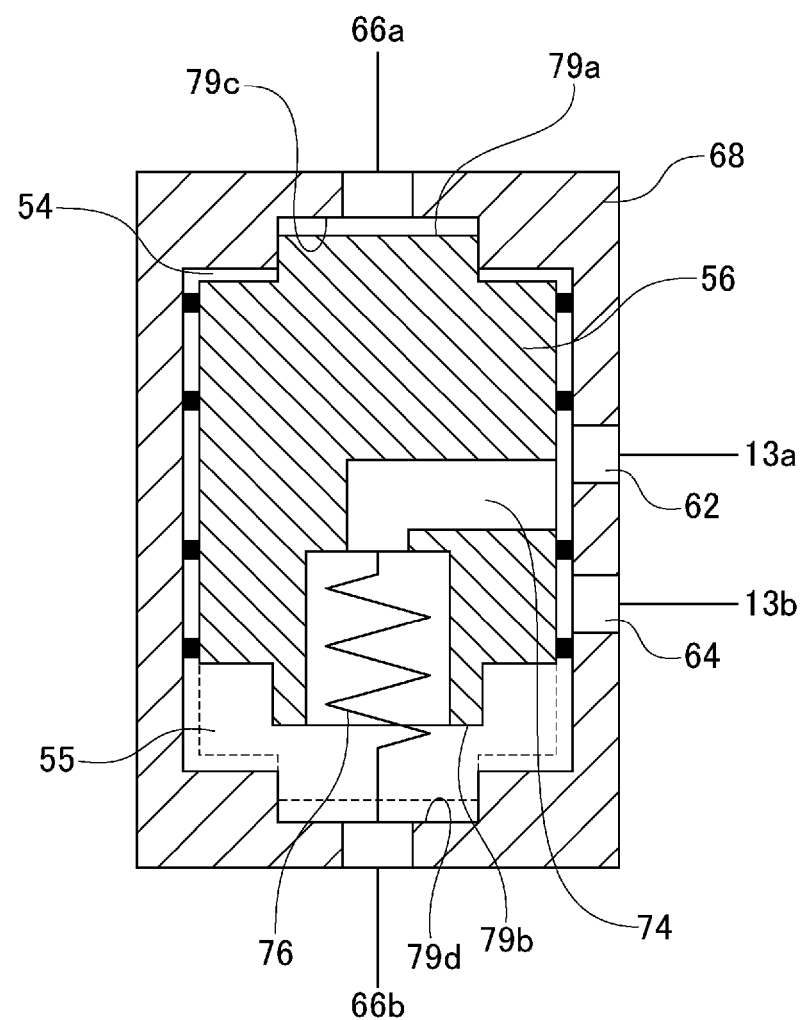
FIG. 6 is a view schematically illustrating another configuration of a spool valve applicable to a cryocooler according to a certain embodiment.

FIG. 6 is a view schematically illustrating another configuration of the spool valve 50 applicable to the cryocooler 10 according to a certain embodiment. As illustrated, the spool 56 includes a first protrusion 79a and a second protrusion 79b. Except for this point, the spool valve 50 illustrated in FIG. 6 has a configuration common to that of the spool valve 50 illustrated in FIG. 1.

The first protrusion 79a protrudes from a first end surface of the spool 56 which faces the valve drive chamber 54. The first protrusion 79a is disposed on the first end surface of the spool 56 to close the outlet of the first gas line 66a to the valve drive chamber 54 when the spool 56 is located at or in the vicinity of the top dead center. The outlet of the first gas line 66a is formed on an upper surface of the sleeve 68 which faces the first end surface of the spool 56. A first recessed portion 79c that receives the first protrusion 79a is formed on the upper surface of the sleeve 68. The first protrusion 79a, the first recessed portion 79c, and the outlet of the first gas line 66a are all disposed on the center axis of the spool 56. The first protrusion 79a is separated from the first recessed portion 79c when the spool 56 is separated from the top dead center.

A working gas region (outer peripheral portion of the valve drive chamber 54) formed between the first end surface of the spool 56 and the upper surface of the sleeve 68 when the spool 56 moves upward and the first protrusion 79a enters the outlet of the first gas line 66a is substantially sealed. Therefore, the working gas region functions as a gas spring chamber, as in the lower section 46b of the piston drive chamber 46 previously described with reference to FIG. 1. It is possible to prevent the spool 56 from colliding or coming into contact with the sleeve 68 at the top dead center, or it is possible to cushion the impact even when the spool 56 collides or comes into contact with the sleeve 68. It is possible to reduce the vibration which may occur due to the reciprocation of the spool 56.

Similarly, the second protrusion 79b protrudes from a second end surface of the spool 56 which faces the second spool valve chamber 55. However, the spool main flow path 74 is open on the second end surface. Accordingly, the second protrusion 79b is formed on the second end surface to surround the opening. The second protrusion 79b is disposed on the second end surface of the spool 56 to close the outlet of the second gas line 66b to the second spool valve chamber 55 when the spool 56 is located at or in the vicinity of the bottom dead center. The outlet of the second gas line 66b is formed on a lower surface of the sleeve 68 which faces the second end surface of the spool 56. A second recessed portion 79d that receives the second protrusion 79b is formed on the lower surface of the sleeve 68. The second protrusion 79b, the second recessed portion 79d, and the outlet of the second gas line 66b are all disposed on the center axis of the spool 56. The second protrusion 79b is separated from the second recessed portion 79*d* when the spool 56 is separated from the bottom dead center.

As illustrated by a dashed line in FIG. 6, a working gas region (outer peripheral portion of the second spool valve chamber 55) formed between the second end surface of the spool 56 and the lower surface of the sleeve 68 when the spool 56 moves downward and the second protrusion 79*b* enters the outlet of the second gas line 66*b* is substantially sealed. Therefore, the working gas region functions as a gas spring chamber. It is possible to prevent the spool 56 from colliding or coming into contact with the sleeve 68 at the bottom dead center, or it is possible to cushion the impact even when the spool 56 collides or comes into contact with the sleeve 68. It is possible to reduce the vibration which may occur due to the reciprocation of the spool 56.

It is not essential that both the first protrusion 79*a* and the second protrusion 79*b* are provided in the spool 56. The spool 56 may have only one of the first protrusion 79*a* and the second protrusion 79*b*.

Figure 7:
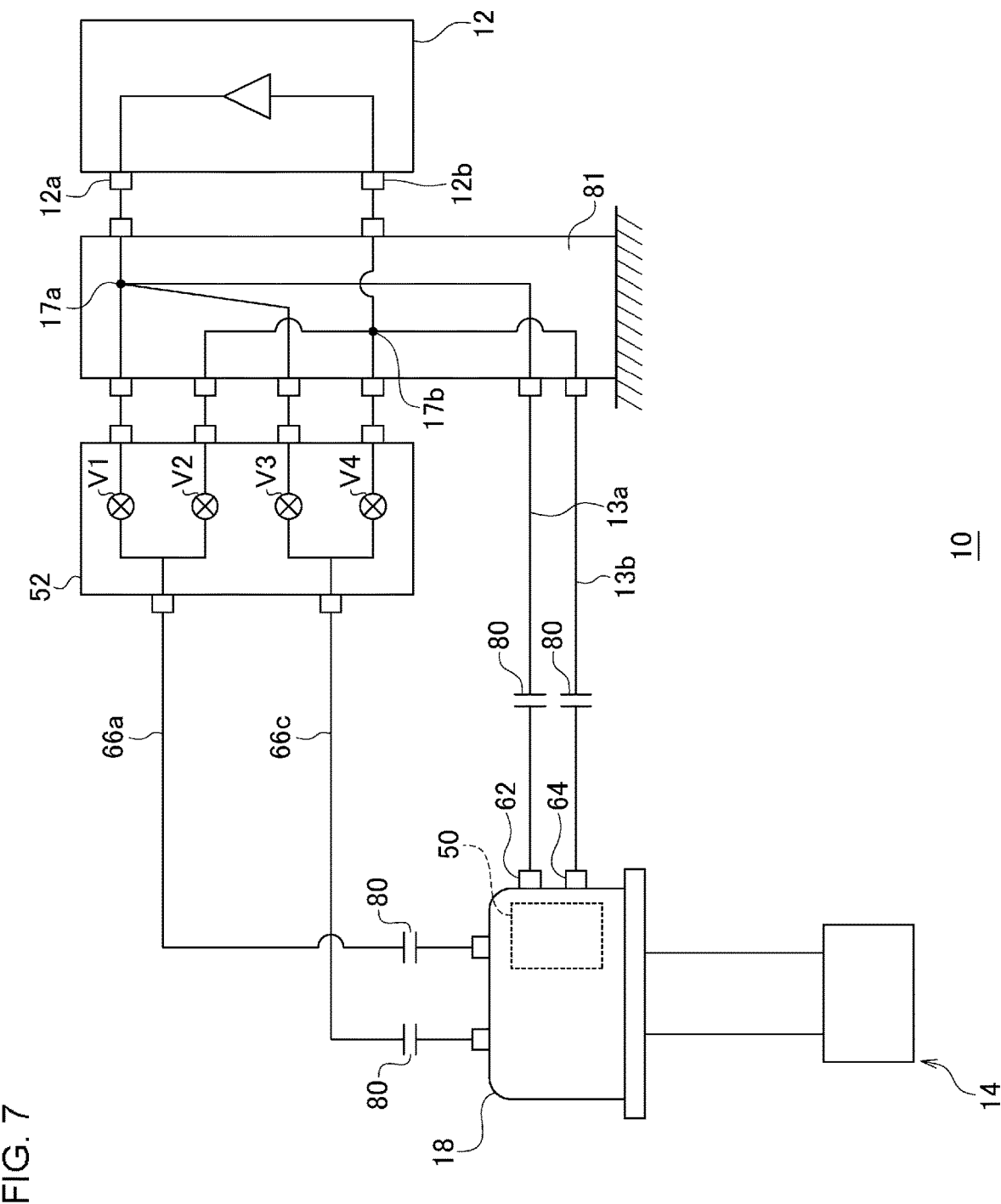
FIG. 7 is a view schematically illustrating a cryocooler according to a second embodiment.

FIG. 7 is a view schematically illustrating the cryocooler 10 according to a second embodiment. The cryocooler 10 according to the second embodiment is different from the cryocooler 10 according to the first embodiment in terms of pipe connection of the working gas circuit. The remaining elements have configurations common to those of the cryocooler 10 in the first embodiment. Hereinafter, with regard to the cryocooler 10 according to the second embodiment, configurations different from those of the first embodiment will be mainly described, and common configurations will be briefly described, or will be omitted in the description.

In the cryocooler 10 according to the second embodiment, a combination of the spool valve 50 and the pressure control mechanism 52 is also used as the flow path switching mechanism. Therefore, as in the cryocooler 10 according to the first embodiment, it is advantageously applicable compared to the existing typical cryocooler that adopts only the rotary valve as the flow path switching mechanism. The spool valve 50 is accommodated in the cold head housing 18 of the cold head 14.

As illustrated in FIG. 7, the cryocooler 10 includes an attachable-detachable coupling 80 that connects the valve drive chamber 54 to the pressure control mechanism 52, and another attachable-detachable coupling 80 that connects the piston drive chamber 46 to the pressure control mechanism 52. The attachable-detachable coupling 80 is provided in each intermediate portion of the first gas line 66*a* and the third gas line 66*c*. For example, the attachable-detachable coupling 80 is a self-sealing coupling.

In this way, the pressure control mechanism 52 is connected to the cold head 14 via the attachable-detachable coupling 80. Accordingly, it is easy to dispose the pressure control mechanism 52 remotely from the cold head 14 by lengthening the first gas line 66*a* and the third gas line 66*c*. This configuration is helpful in suppressing a possibility that electromagnetic noise and/or mechanical vibration which can occur in the pressure control mechanism 52 may be transmitted to the cold head 14. In addition, the pressure control mechanism 52 is detachably connected to the cold head 14 by the attachable-detachable coupling 80. Accordingly, a worker can detach the pressure control mechanism 52 from the cold head 14 for maintenance work.

The attachable-detachable coupling 80 may be additionally provided in another place in the working gas circuit of the cryocooler 10. As illustrated in FIG. 7, for example, the attachable-detachable coupling 80 may be provided on at least one of the high pressure line 13*a* and the low pressure line 13*b*. In this case, it is possible to suppress a possibility that the noise or the vibration may be transmitted from the compressor 12 to the cold head 14.

In addition, the cryocooler 10 may include a manifold 81 having a high pressure line branch portion 17*a* and a low pressure line branch portion 17*b*. The compressor 12 and the cold head 14 are connected to each other via the manifold 81, and the compressor 12 and the pressure control mechanism 52 are connected to each other. The manifold 81 may be fixed to a floor surface or other stationary portions. The compressor 12 is disposed away from the manifold 81, and is connected to the manifold 81 by using a pipe. In this case, it is possible to suppress a possibility that the noise or the vibration may be transmitted from the compressor 12 to the cold head 14.

As illustrated in FIG. 7, the pressure control mechanism 52 may be disposed away from the manifold 81, and may be connected to the manifold 81 by using a pipe. Alternatively, the pressure control mechanism 52 may be mounted on the manifold 81.

Figure 8:
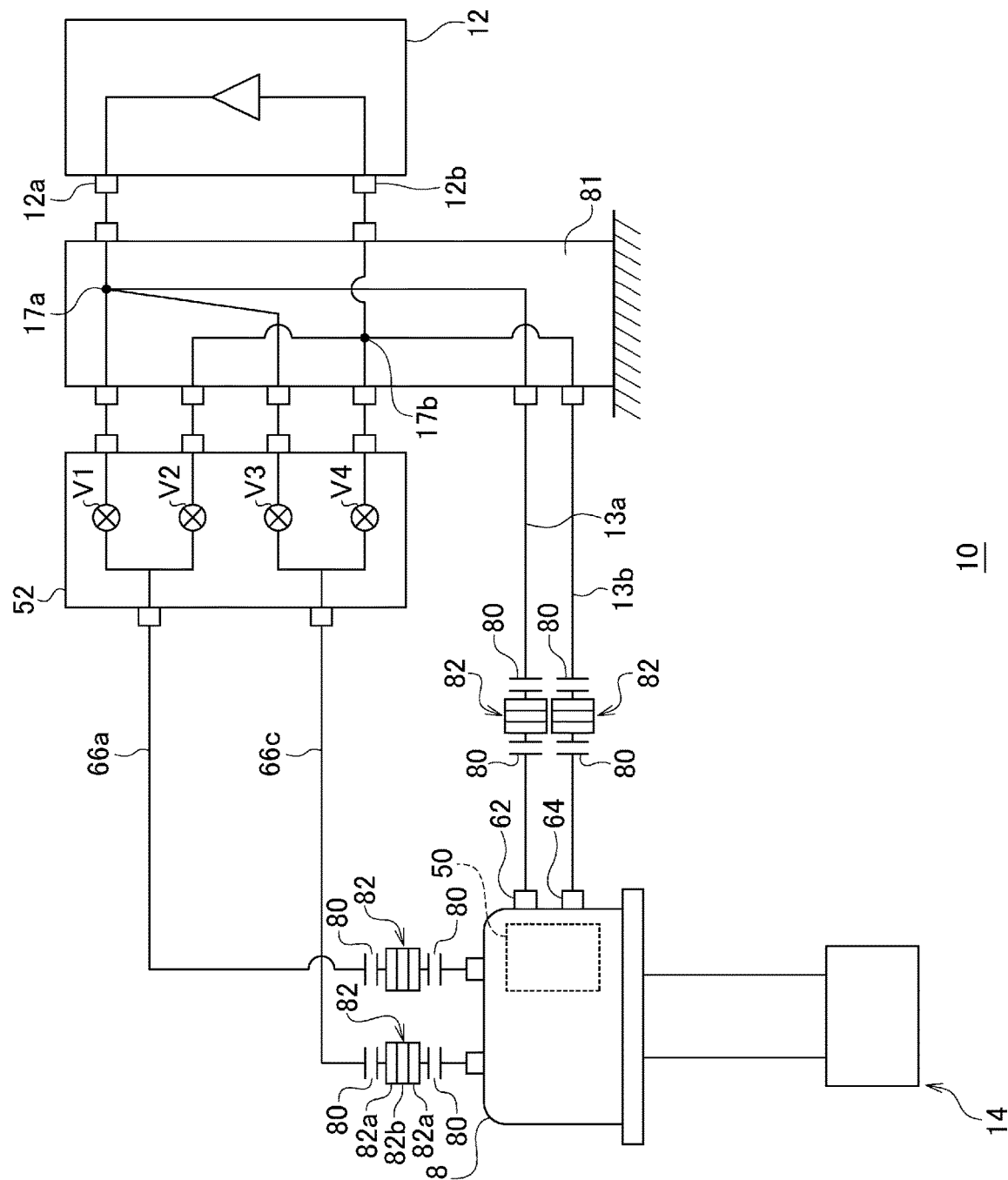
FIG. 8 is a view schematically illustrating another configuration of the cryocooler according to the second embodiment.

FIG. 8 is a view schematically illustrating another configuration of the cryocooler 10 according to the second embodiment. The cryocooler 10 may include a noise blocking structure 82 installed in at least one of the high pressure line 13*a*, the low pressure line 13*b*, the first gas line 66*a*, and the third gas line 66*c*. The noise blocking structure 82 is connected to the attachable-detachable coupling 80 directly or via a pipe, and is configured to block or reduce the electromagnetic noise transmitted through the pipe in which the noise blocking structure 82 is installed. The attachable-detachable coupling 80 is provided on at least one side (both sides in FIG. 8) of the noise blocking structure 82.

As an example, the noise blocking structure 82 includes a pair of flanges 82*a* and a noise blocking body 82*b* pinched between the flanges 82*a*. The noise blocking body 82*b* is a metal body coated with an insulating coating material such as ceramic coating or fluororesin coating. The flange 82*a* and the noise blocking body 82*b* are fixed to each other by using an appropriate fastener such as a bolt and a nut. The working gas flow path is formed to penetrate the flange 82*a* and the noise blocking body 82*b*.

Since the noise blocking structure 82 is provided, it is possible to further suppress a possibility that the noise may be transmitted from the compressor 12 or the pressure control mechanism 52 to the cold head 14.

Figure 9:
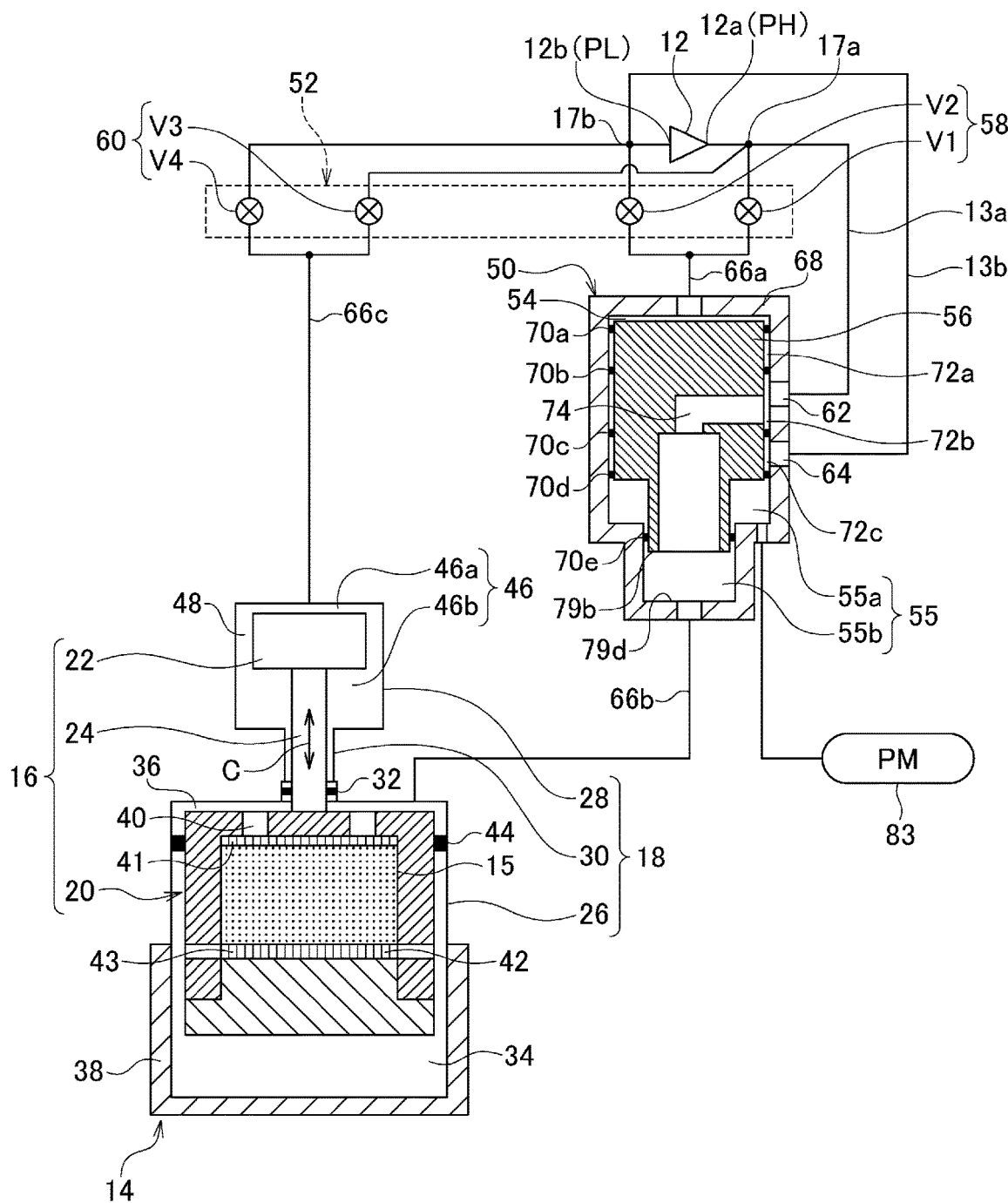
FIG. 9 is a view schematically illustrating a cryocooler according to a third embodiment.

FIG. 9 is a view schematically illustrating the cryocooler 10 according to a third embodiment. The cryocooler 10 according to the third embodiment is different from the cryocooler 10 according to the first embodiment in terms of the second spool valve chamber 55 of the spool valve 50. The remaining elements have configurations common to those of the cryocooler 10 in the first embodiment. Hereinafter, with regard to the cryocooler 10 according to the third embodiment, configurations different from those of the first embodiment will be mainly described, and common configurations will be briefly described, or will be omitted in the description.

The spool valve 50 includes a plurality of mutually sealed sections adjacent to the spool 56 on the side opposite to the valve drive chamber 54. The spool 56 moves between the first position and the second position due to the pressure difference between the valve drive chamber 54 and at least one of the plurality of sections. The second spool valve chamber 55 is divided into a first section 55*a* serving as a back pressure chamber and a second section 55*b* forming a portion of the working gas flow path to the cold head 14. The first section 55*a* corresponds to an outer peripheral portion of the second spool valve chamber 55, and the second section 55b corresponds to a central portion of the second spool valve chamber 55.

The second protrusion 79b protrudes from the second end surface of the spool 56 which faces the second spool valve chamber 55. The spool main flow path 74 is open on the second end surface. Accordingly, the second protrusion 79b is formed on the second end surface to surround the opening. The second recessed portion 79d that receives the second protrusion 79b is formed on the lower surface of the sleeve 68. The second protrusion 79b is disposed in the second recessed portion 79d not only when the spool 56 is located at bottom dead center but also when the spool 56 is located at top dead center. The length of the second protrusion 79b and the depth of the second recessed portion 79d are set so that at least a tip part of the second protrusion 79b enters the second recessed portion 79d over the entire stroke of the spool 56.

The spool valve 50 includes a fifth sealing member 70e disposed between the first section 55a and the second section 55b, and configured to prevent or minimize the direct circulation of working gas therebetween. The fifth sealing member 70e is provided on the outer periphery of the side surface close to the tip of the second protrusion 79b, and is pinched between the second protrusion 79b and the second recessed portion 79d regardless of the position of the spool 56. Therefore, while the spool 56 reciprocates, the first section 55a and the second section 55b are always sealed by the fifth sealing member 70e.

An intermediate pressure buffer 83 is connected to the first section 55a. The intermediate pressure buffer 83 has an intermediate pressure PM (for example, an average pressure of the high pressure PH and the low pressure PL) between the high pressure PH and the low pressure PL. Therefore, the pressure in the first section 55a is maintained at the intermediate pressure PM. The intermediate pressure buffer 83 may be a back pressure chamber of a linear compressor (for example, a back pressure chamber 86d illustrated in FIG. 14) when the pressure control mechanism 52 has the linear compressor as described later.

The second section 55b connects the spool main flow path 74 to the second gas line 66b. The outlet of the second gas line 66b is formed on the lower surface of the sleeve 68 which faces the second end surface of the spool 56 inside the second recessed portion 79d.

The valve timing illustrated in FIG. 4 can also be adopted for the cryocooler 10 according to the third embodiment.

Therefore, in the intake process of the cryocooler 10, the second on-off valve V2 is opened, and the first on-off valve V1 is closed. The compressor suction port 12b communicates with the valve drive chamber 54, and the pressure in the valve drive chamber 54 is the low pressure PL. The first section 55a has the intermediate pressure PM. Accordingly, the spool 56 moves inside the sleeve 68 in the axial direction so that the valve drive chamber 54 contracts due to the pressure difference between the valve drive chamber 54 and the first section 55a. The spool main flow path 74 is connected to the high pressure port 62. The working gas having the high pressure PH is supplied from the compressor discharge port 12a to the expansion chamber 34 of the cold head 14 through the spool valve 50.

In the exhaust process, the first on-off valve V1 is opened, and the second on-off valve V2 is closed. The compressor discharge port 12a communicates with the valve drive chamber 54, and the pressure in the valve drive chamber 54 reaches the high pressure PH. The first section 55a has the intermediate pressure PM. Accordingly, the spool 56 moves inside the sleeve 68 in the axial direction so that the valve drive chamber 54 expands due to the pressure difference between the valve drive chamber 54 and the first section 55a. The spool main flow path 74 is connected to the low pressure port 64. The working gas expands in the expansion chamber 34, and the working gas having the consequently generated low pressure PL is recovered from the expansion chamber 34 to the compressor suction port 12b through the spool valve 50.

In this way, as in the spool valve 50 according to the first embodiment, the spool valve 50 according to the third embodiment can function as the flow path switching mechanism of the cryocooler 10 which alternately connects the compressor discharge port 12a and the compressor suction port 12b to the expansion chamber 34. The intermediate pressure PM is introduced into the first section 55a, and the driving of the spool 56 can be supported by the pressure difference between the first section 55a and the valve drive chamber 54. Accordingly, the spool valve 50 according to the third embodiment may not have the return spring 76 illustrated in FIGS. 1 and 2.

Figure 10:
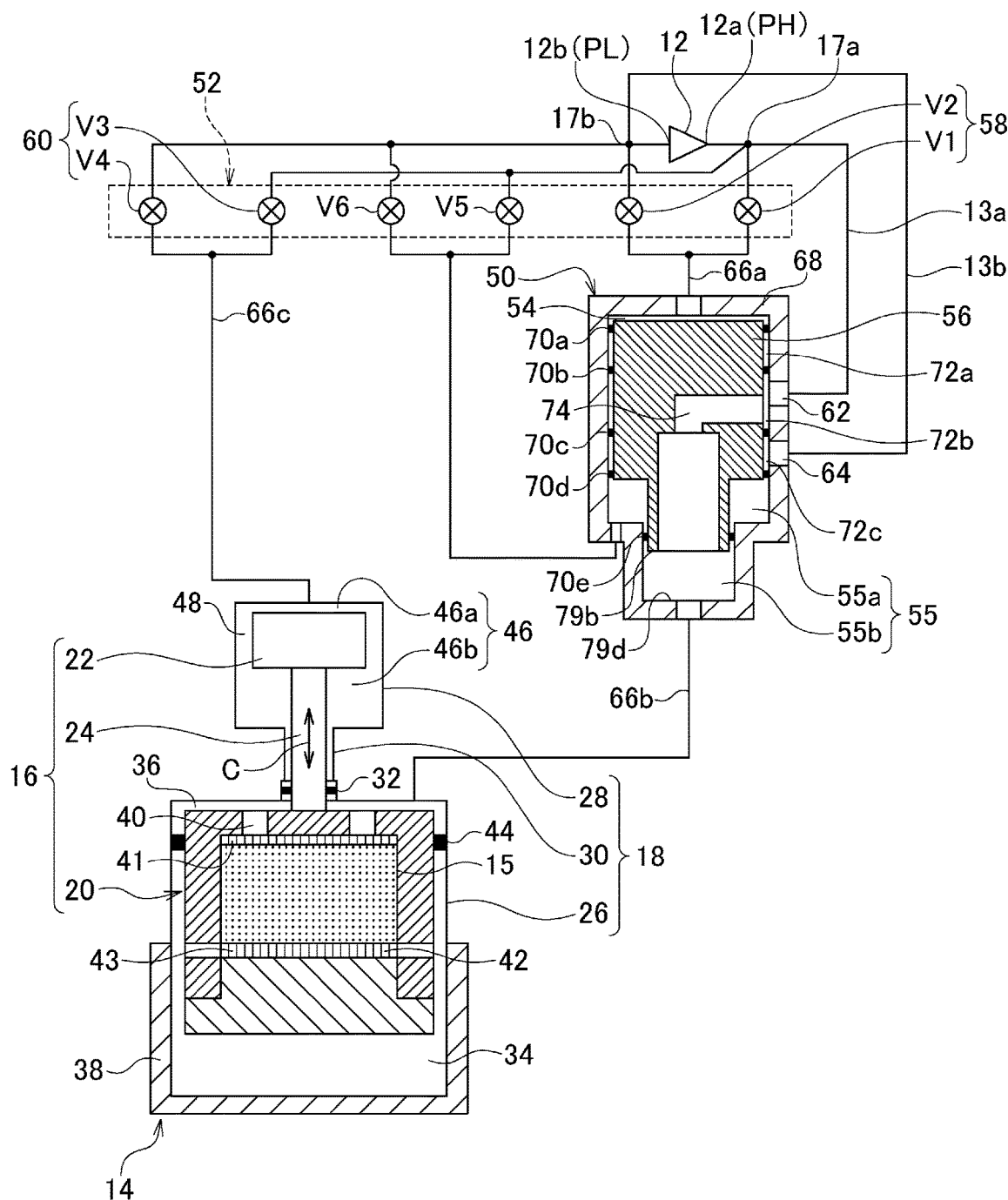
FIG. 10 is a view schematically illustrating another configuration of the cryocooler according to the third embodiment.

FIG. 10 is a view schematically illustrating another configuration of the cryocooler 10 according to the third embodiment. It is not essential to hold the first section 55a at a constant pressure (that is, to provide the intermediate pressure buffer 83 in the first section 55a). The pressure control mechanism 52 may control the pressure in the first section 55a to support the reciprocation of the spool 56.

The pressure control mechanism 52 is configured so that the pressure fluctuation having an opposite phase to the pressure fluctuation of the valve drive chamber 54 is generated in the first section 55a. The pressure control mechanism 52 includes a fifth on-off valve V5 and a sixth on-off valve V6 in addition to the four valves (V1 to V4) described above. The fifth on-off valve V5 connects the compressor discharge port 12a to the first section 55a, and the sixth on-off valve V6 connects the compressor suction port 12b to the second section 55b.

Figure 11:
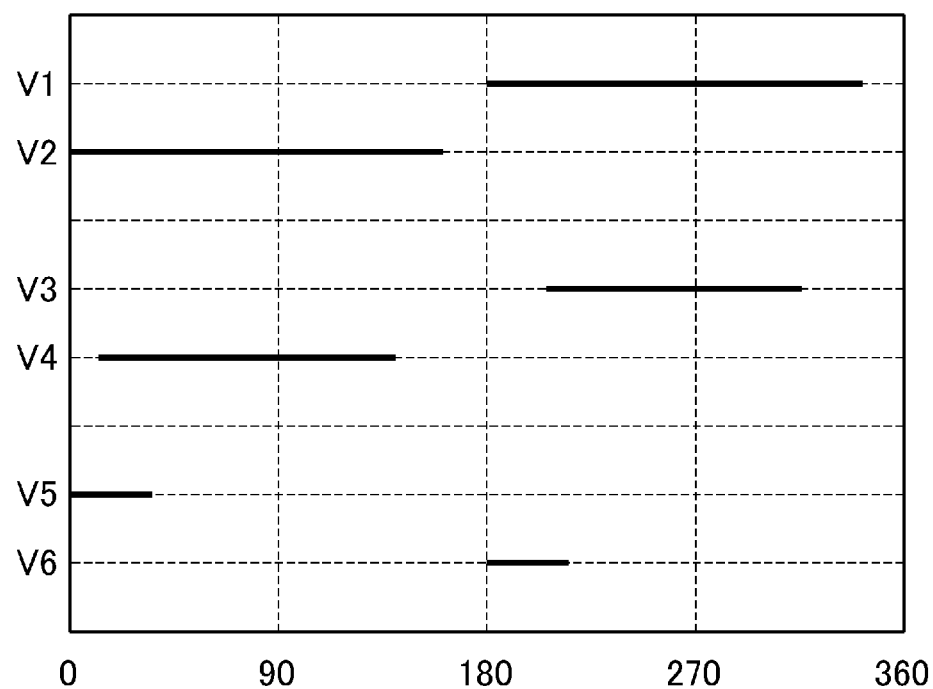
FIG. 11 is a view illustrating a valve timing of a pressure control mechanism illustrated in FIG. 10.

FIG. 11 is a view illustrating the valve timing of the pressure control mechanism 52 illustrated in FIG. 10. Here, the valve timing illustrated in FIG. 4 can be adopted for the four valves (V1 to V4) common to the first embodiment. The fifth on-off valve V5 is opened simultaneously with the second on-off valve V2, and is closed before the second on-off valve V2 is closed. The sixth on-off valve V6 is opened simultaneously with the first on-off valve V1, and is closed before the first on-off valve V1 is closed. As illustrated in FIG. 11, the fifth on-off valve V5 is open only at the beginning of a period while the second on-off valve V2 is open, and the sixth on-off valve V6 is open only at the beginning of a period while the first on-off valve V1 is open.

Therefore, in the intake process, the second on-off valve V2 and the fifth on-off valve V5 are first opened. The compressor discharge port 12a is communicated with the first section 55a, the pressure in the first section 55a becomes a high pressure PH, the compressor suction port 12b is communicated with the valve drive chamber 54, and the pressure in the valve drive chamber 54 becomes a low pressure PL. The spool 56 moves inside the sleeve 68 in the axial direction so that the valve drive chamber 54 contracts due to the pressure difference between the valve drive chamber 54 and the first section 55a. The spool main flow path 74 is connected to the high pressure port 62. The working gas having the high pressure PH is supplied from the compressor discharge port 12a to the expansion chamber 34 of the cold head 14 through the spool valve 50.

In the exhaust process, the first on-off valve V1 and the sixth on-off valve V6 are first opened. The compressor discharge port 12a communicates with the valve drive chamber 54, and the pressure in the valve drive chamber 54 reaches high pressure PH. The compressor suction port 12b communicates with the first section 55a, and the pressure in the first section 55a reaches low pressure PL. The spool 56 moves inside the sleeve 68 in the axial direction so that the valve drive chamber 54 expands due to the pressure difference between the valve drive chamber 54 and the first section 55a. The spool main flow path 74 is connected to the low pressure port 64. The working gas expands in the expansion chamber 34, and the working gas having the consequently generated low pressure PL is recovered from the expansion chamber 34 to the compressor suction port 12b through the spool valve 50.

Figure 12:
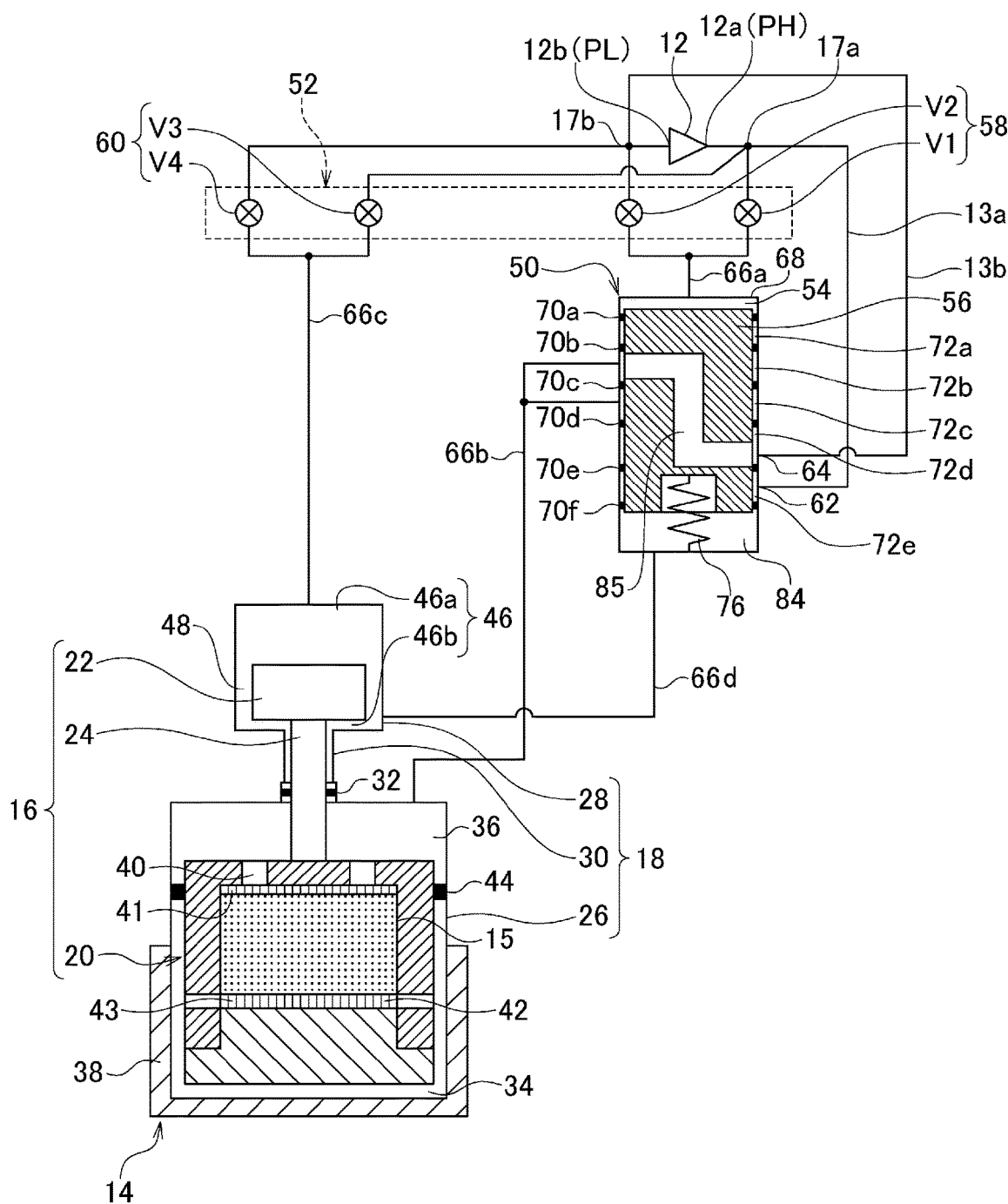
FIG. 12 is a view schematically illustrating a cryocooler according to a fourth embodiment.

FIG. 12 is a view schematically illustrating the cryocooler 10 according to a fourth embodiment. The cryocooler 10 according to the fourth embodiment is different from the cryocooler 10 according to the first embodiment mainly in terms of the spool valve 50. The remaining elements have configurations common to those of the cryocooler 10 in the first embodiment. Hereinafter, with regard to the cryocooler 10 according to the fourth embodiment, configurations different from those of the first embodiment will be mainly described, and common configurations will be briefly described, or will be omitted in the description.

The spool valve 50 includes a back pressure chamber 84 adjacent to the spool 56 on the side opposite to the valve drive chamber 54, and a connection flow path 85 sealed from the valve drive chamber 54 and the back pressure chamber 84. The connection flow path 85 connects the expansion chamber 34 to the compressor discharge port 12a when the spool 56 is located at the first position, and connects the expansion chamber 34 to the compressor suction port 12b when the spool 56 is located at the second position.

In addition, the spool valve 50 has a plurality of sealing members disposed in a clearance between the spool 56 and the sleeve 68, specifically, a first sealing member 70a, a second sealing member 70b, a third sealing member 70c, a fourth sealing member 70d, a fifth sealing member 70e, and a sixth sealing member 70f. The sealing members separate the working gas space inside the spool valve 50 into the valve drive chamber 54, the first clearance region 72a, the second clearance region 72b, the third clearance region 72c, the fourth clearance region 72d, the fifth clearance region 72e, and the back pressure chamber 84. The back pressure chamber 84 is sealed from the fifth clearance region 72e by the sixth sealing member 70f.

The lower section 46b (that is, the gas spring chamber) of the piston drive chamber 46 is connected to the back pressure chamber 84. The back pressure chamber 84 is connected to the lower section 46b through the fourth gas line 66d. The back pressure chamber 84 and the gas spring chamber have the intermediate pressure PM (for example, the average pressure of the high pressure PH and the low pressure PL) between the high pressure PH and the low pressure PL. Therefore, unlike the above-described embodiments, in the cryocooler 10 is configured as follows. When the spool 56 is located at the top dead center, the drive piston 22 is located at the bottom dead center, and when the spool 56 is located at the bottom dead center, the drive piston 22 is located at the top dead center. In this way, fluctuations are suppressed in the total volume of the back pressure chamber 84 and the gas spring chamber when the spool 56 and the drive piston 22 reciprocate. In this manner, the pressure fluctuations in the back pressure chamber 84 and the gas spring chamber are reduced.

The connection flow path 85 penetrates the spool 56 to connect the fourth clearance region 72d to the second clearance region 72b. When the spool 56 is located at the top dead center, the low pressure port 64 is connected to the fourth clearance region 72d, and the high pressure port 62 is closed by the fifth clearance region 72e. When the spool 56 is located at the bottom dead center, the high pressure port 62 is connected to the fourth clearance region 72d, and the low pressure port 64 is closed by the third clearance region 72c.

In addition, the second gas line 66b extends from the expansion chamber 34, branches into two branch paths in the intermediate portion, and is connected to the spool valve 50. The first branch path is used to supply the working gas from the spool valve 50 to the expansion chamber 34, and the second branch path is used to discharge the working gas from the expansion chamber 34 to the spool valve 50. When the spool 56 is located at the top dead center, the second branch path of the second gas line 66b is connected to the second clearance region 72b, and the first branch path of the second gas line 66b is closed by the third clearance region 72c. When the spool 56 is located at the bottom dead center, the first branch path of the second gas line 66b is connected to the second clearance region 72b, and the second branch path of the second gas line 66b is closed by the first clearance region 72a.

Figure 13:
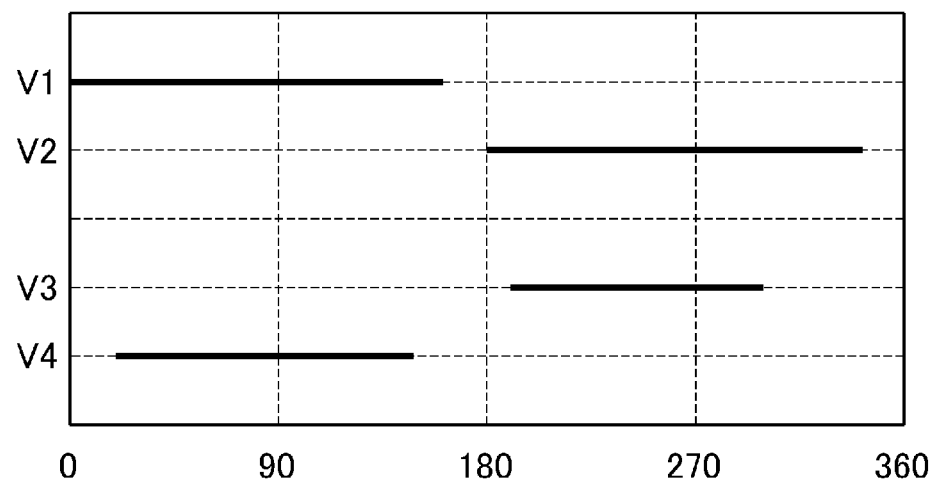
FIG. 13 is a view illustrating a valve timing of a pressure control mechanism illustrated in FIG. 12.

FIG. 13 is a view illustrating the valve timing of the pressure control mechanism 52 illustrated in FIG. 12. Here, for the first on-off valve V1 and the second on-off valve V2, a valve timing opposite to the valve timing illustrated in FIG. 4 is used. For the third on-off valve V3 and the fourth on-off valve V4, the valve timing illustrated in FIG. 4 can be adopted. That is, as illustrated in FIG. 13, the fourth on-off valve V4 is opened while the first on-off valve V1 is open, and the third on-off valve V3 is opened while the second on-off valve V2 is open.

Therefore, in the intake process, the first on-off valve V1 and the fourth on-off valve V4 are opened. The compressor discharge port 12a communicates with the valve drive chamber 54, and the pressure in the valve drive chamber 54 reaches the high pressure PH. The back pressure chamber 84 has the intermediate pressure PM. Accordingly, the spool 56 moves inside the sleeve 68 in the axial direction so that the valve drive chamber 54 expands due to the pressure difference between the valve drive chamber 54 and the back pressure chamber 84. The connection flow path 85 connects the high pressure port 62 to the second gas line 66b. The working gas having the high pressure PH is supplied from the compressor discharge port 12a to the expansion chamber 34 of the cold head 14 through the spool valve 50.

At this time, since the fourth on-off valve V4 is opened, the upper section 46a of the piston drive chamber 46 has the low pressure PL, and the drive piston 22 moves inside the piston drive chamber 46 in the axial direction so that the lower section 46b expands. Therefore, the working gas pushed out from the back pressure chamber 84 by the movement of the spool 56 can be received in the lower section 46b through the fourth gas line 66d.

In the exhaust process, the second on-off valve V2 and the third on-off valve V3 are opened. The compressor suction port 12b communicates with the valve drive chamber 54, and the pressure in the valve drive chamber 54 is the low pressure PL. The back pressure chamber 84 has the intermediate pressure PM. Accordingly, the spool 56 moves inside the sleeve 68 in the axial direction so that the valve drive chamber 54 contracts due to the pressure difference between the valve drive chamber 54 and the back pressure chamber 84. The connection flow path 85 connects the low pressure port 64 to the second gas line 66b. The working gas expands in the expansion chamber 34, and the working gas having the consequently generated low pressure PL is recovered from the expansion chamber 34 to the compressor suction port 12b through the spool valve 50.

At this time, since the third on-off valve V3 is opened, the upper section 46a of the piston drive chamber 46 has the high pressure PH, and the drive piston 22 moves inside the piston drive chamber 46 in the axial direction so that the lower section 46b contracts. Therefore, this time, the working gas pushed out from the lower section 46b by the movement of the drive piston 22 can be received in the back pressure chamber 84 through the fourth gas line 66d.

In this way, as in the spool valve 50 according to the first embodiment, the spool valve 50 according to the fourth embodiment can function as the flow path switching mechanism of the cryocooler 10 which alternately connects the compressor discharge port 12a and the compressor suction port 12b to the expansion chamber 34. The intermediate pressure PM is introduced into the back pressure chamber 84, and the driving of the spool 56 can be supported by the pressure difference between the back pressure chamber 84 and the valve drive chamber 54.

A destination for connecting the back pressure chamber 84 is not limited to the lower section 46b of the piston drive chamber 46. For example, the back pressure chamber 84 may be connected to the intermediate pressure buffer 83 as in the embodiment illustrated in FIG. 9. Alternatively, the back pressure chamber 84 may be connected to the room temperature chamber 36 of the cold head 14. In this case, a flow path resistor (for example, an orifice or a throttle valve) may be provided in the flow path which connects the back pressure chamber 84 to the room temperature chamber 36. The back pressure chamber 84 may be connected to the connection flow path 85. In this case, a flow path resistor may be provided in the flow path inside the spool 56 which connects the back pressure chamber 84 to the connection flow path 85.

Figure 14:
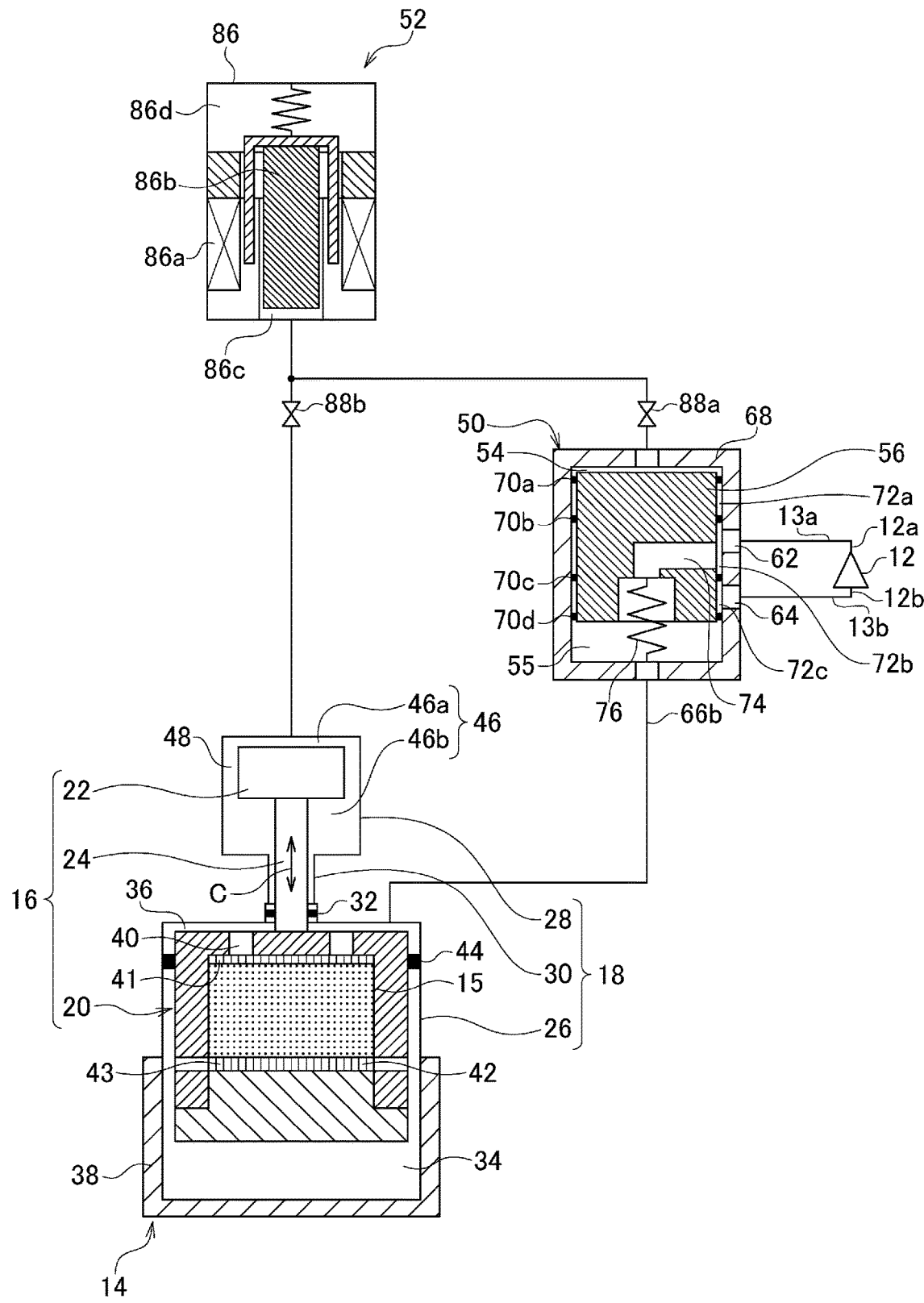
FIG. 14 is a view schematically illustrating another configuration of a pressure control mechanism applicable to a cryocooler according to a certain embodiment.

FIG. 14 is a view schematically illustrating another configuration of the pressure control mechanism 52 applicable to the cryocooler 10 according to a certain embodiment. As illustrated in FIG. 14, the pressure control mechanism 52 may include a linear compressor 86 connected to the valve drive chamber 54 and the piston drive chamber 46. In this case, the pressure control mechanism 52 does not have the rotary valve.

The linear compressor 86 includes an actuator 86a such as an electromagnet, a compressor piston 86b that reciprocates by driving the actuator 86a, a compression chamber 86c connected to the valve drive chamber 54 and the piston drive chamber 46, and a back pressure chamber 86d. In the compression chamber 86c, when the compressor piston 86b moves forward (when the compressor piston 86b moves downward in FIG. 14), the working gas is compressed, and the high pressure working gas is supplied from the compression chamber 86c to the valve drive chamber 54 and the piston drive chamber 46. When the compressor piston 86b moves rearward (when the compressor piston 86b moves upward in FIG. 14), the pressure in the compression chamber 86c decreases, thereby decreasing the pressure in the valve drive chamber 54 and the piston drive chamber 46. As the linear compressor 86, a known configuration can be appropriately adopted.

In this way, the pressure control mechanism 52 can generate the pressure fluctuations similar to those illustrated in FIG. 4 in the valve drive chamber 54 and the piston drive chamber 46. Therefore, the pressure control mechanism 52 can operate the spool valve 50 to alternately connect the compressor discharge port 12a and the compressor suction port 12b to the expansion chamber 34.

When necessary, in order to adjust the phase of the pressure fluctuations or for other reasons, a first flow path resistor 88a may be provided in the flow path which connects the linear compressor 86 to the valve drive chamber 54, and a second flow path resistor 88b may be provided in the flow path which connects the linear compressor 86 to the piston drive chamber 46.

Hitherto, the present invention has been described based on the embodiments. The present invention is not limited to the above-described embodiments. It may be understood by those skilled in the art that various design changes can be made, various modification examples can be adopted, and the modification examples also fall within the scope of the present invention.

Various features described with regard to a certain embodiment are also applicable to other embodiments. A new embodiment acquired from the combination compatibly achieves respective advantageous effects of the combined embodiments.

For example, the attachable-detachable coupling 80 described in the second embodiment may be applied to the cryocooler 10 according to the third embodiment, the fourth embodiment, or another embodiment.

The present invention can be used in a field of the cryocooler and the flow path switching mechanism of the cryocooler.

It should be understood that the invention is not limited to the above-described embodiment, but may be modified into various forms on the basis of the spirit of the invention. Additionally, the modifications are included in the scope of the invention.

What is claimed is:

1. A cryocooler comprising:
    a cold head including a displacer movable in an axial direction, a drive piston connected to the displacer to move the displacer in the axial direction, an expansion chamber being formed with the displacer, and a piston drive chamber being formed with the drive piston, the drive piston being driven in the axial direction by a pressure difference between the piston drive chamber and the expansion chamber;
    a spool valve including a valve drive chamber and a spool that moves between a first position and a second position in response to a pressure of the valve drive chamber, the spool connecting the expansion chamber to a compressor discharge port at the first position, the spool connecting the expansion chamber to a compressor suction port at the second position, and the spool reciprocating between the first position and the second position to generate a periodic pressure fluctuation in the expansion chamber; and
    a pressure control mechanism configured to control a pressure of the valve drive chamber so that the spool reciprocates between the first position and the second position, and to generate a pressure fluctuation having an opposite phase to the pressure fluctuation in the expansion chamber in the piston drive chamber in synchronization with the reciprocation of the spool.

2. The cryocooler according to claim 1,
wherein the pressure control mechanism is disposed away from the cold head.

3. The cryocooler according to claim 1, further comprising:
 a first attachable-detachable coupling for connecting the valve drive chamber to the pressure control mechanism; and
 a second attachable-detachable coupling for connecting the piston drive chamber to the pressure control mechanism.

4. The cryocooler according to claim 1,
wherein the pressure control mechanism is configured to generate a pressure fluctuation having an opposite phase to the pressure fluctuation of the expansion chamber in the valve drive chamber.

5. The cryocooler according to claim 1,
wherein the pressure control mechanism includes a rotary valve that alternately connects the compressor discharge port and the compressor suction port to the valve drive chamber, and that alternately connects the compressor discharge port and the compressor suction port to the piston drive chamber.

6. The cryocooler according to claim 1,
wherein the pressure control mechanism includes a linear compressor connected to the valve drive chamber and the piston drive chamber.

7. The cryocooler according to claim 1,
wherein the spool valve includes a plurality of mutually sealed sections adjacent to the spool on a side opposite to the valve drive chamber, and
the spool is moved between the first position and the second position by a pressure difference between the valve drive chamber and at least one section of the plurality of sections.

8. The cryocooler according to claim 1,
wherein the spool valve includes flow paths symmetrically disposed around a center axis of the spool.

9. The cryocooler according to claim 1,
wherein the spool valve includes
 a back pressure chamber adjacent to the spool on a side opposite to the valve drive chamber, and
 a connection flow path sealed from the valve drive chamber and the back pressure chamber, connecting the expansion chamber to the compressor discharge port when the spool is located at the first position, and connecting the expansion chamber to the compressor suction port when the spool is located at the second position.

10. The cryocooler according to claim 1,
wherein the spool valve includes
 a second gas chamber adjacent to the spool on a side opposite to the valve drive chamber, and
 a connection flow path sealed from the valve drive chamber, connected to the expansion chamber via the second gas chamber, connecting the expansion chamber to the compressor discharge port when the spool is located at the first position, and connecting the expansion chamber to the compressor suction port when the spool is located at the second position.

11. A flow path switching mechanism of a cryocooler, in which the cryocooler includes a cold head including a displacer movable in an axial direction, a drive piston connected to the displacer to move the displacer in the axial direction, an expansion chamber being formed with the displacer, and a piston drive chamber being formed with the drive piston, the drive piston being driven in the axial direction by a pressure difference between the piston drive chamber and the expansion chamber,
the flow path switching mechanism comprising:
 a spool valve including a valve drive chamber and a spool that moves between a first position and a second position in response to a pressure of the valve drive chamber, the spool connecting the expansion chamber to a compressor discharge port at the first position, the spool connecting the expansion chamber to a compressor suction port at the second position, and the spool reciprocating between the first position and the second position to generate a periodic pressure fluctuation in the expansion chamber; and
 a pressure control mechanism configured to control a pressure of the valve drive chamber so that the spool reciprocates between the first position and the second position, and to generate a pressure fluctuation having an opposite phase to the pressure fluctuation in the expansion chamber in the piston drive chamber in synchronization with the reciprocation of the spool.

* * * * *